United States Patent [19]
Brazell et al.

[11] Patent Number: 5,634,748
[45] Date of Patent: Jun. 3, 1997

[54] DRILL PRESS HAVING A MOVABLE HEAD AND A TILT TABLE

[75] Inventors: Kenneth M. Brazell, Phoenix; Robert G. Everts, Chandler; Harry G. Rickard, Phoenix, all of Ariz.; Kouichi Miyamoto, Tokyo-to, Japan; Takeshi Shiotani, Tokyo-to, Japan; Mitsumasa Sato, Tokyo-to, Japan; Tatsuya Wada, Tokyo-to, Japan; Katsutoshi Kouichiyama, Tokyo-to, Japan

[73] Assignee: Ryobi Limited, Tokyo, Japan

[21] Appl. No.: 65,352

[22] Filed: May 19, 1993

[51] Int. Cl.$^6$ .............................. B23B 39/00; B23B 47/00
[52] U.S. Cl. ..................... 408/89; 408/91; 408/95; 408/103; 408/128; 408/236
[58] Field of Search ...................... 408/67, 87, 88, 408/89, 91, 95, 98, 103, 110, 111, 128, 234, 236; 269/60, 71, 95

[56] References Cited

U.S. PATENT DOCUMENTS

| | | | |
|---|---|---|---|
| 395,943 | 1/1889 | Batman | 408/89 |
| 557,004 | 3/1896 | Mill | 408/88 |
| 1,564,876 | 12/1925 | Mansfield | 408/89 |
| 2,728,363 | 12/1955 | Muehling | 408/89 |
| 2,866,367 | 12/1958 | Wilkes | 269/91 |
| 2,883,201 | 8/1959 | Kruchten | 408/103 |
| 3,102,440 | 9/1963 | Miller | 408/236 |
| 3,178,968 | 4/1965 | Pettigrew et al. | 408/88 |
| 3,244,031 | 4/1966 | Mitchell | 408/128 |
| 3,245,289 | 4/1966 | Nelson | 408/98 |
| 3,382,740 | 5/1968 | Lotta | |
| 3,657,963 | 4/1972 | Miller | |
| 3,782,847 | 1/1974 | Kulzer | |
| 4,118,141 | 10/1978 | Spohn, Jr. | |
| 4,505,624 | 3/1985 | Kelly, Jr. | 408/109 |
| 5,102,270 | 4/1992 | Warren | 408/103 |

FOREIGN PATENT DOCUMENTS

| | | | |
|---|---|---|---|
| 1124121 | 10/1956 | France | 408/88 |
| 1145697 | 10/1957 | France | 408/88 |

*Primary Examiner*—Daniel W. Howell
*Attorney, Agent, or Firm*—Brooks & Kushman P.C.

[57] ABSTRACT

A drill press assembly having a base mountable to a work bench, a vertical column attached to the base and a drill head assembly having an electric motor and a quill. The drill head assembly is movably attached to the column. A rack is rotatably attached to the top of the column and is engaged by a crank and pinion mechanism attached to the frame of the drill head assembly which permits the drill head assembly to be displaced vertically and rotated about the column. A tilt table is attachable to the base of the drill press. A locking mechanism having a bolt passing through a longitudinal slot in the supporting base of the tilt table and a transverse slot in the base is engaged by an eccentrically mounted camshaft to lock the supporting base of the tilt table to the top surface of the drill press base. A pivoting frame is pivotably attached to the supporting base and contains a table plate. A fence is attachable to the top of the pivoting frame. The fence has a stopping block to facilitate the location of a workpiece on the tilt table. A work clamp is also provided on the drill head assembly to clamp a workpiece on the tilt table.

73 Claims, 18 Drawing Sheets

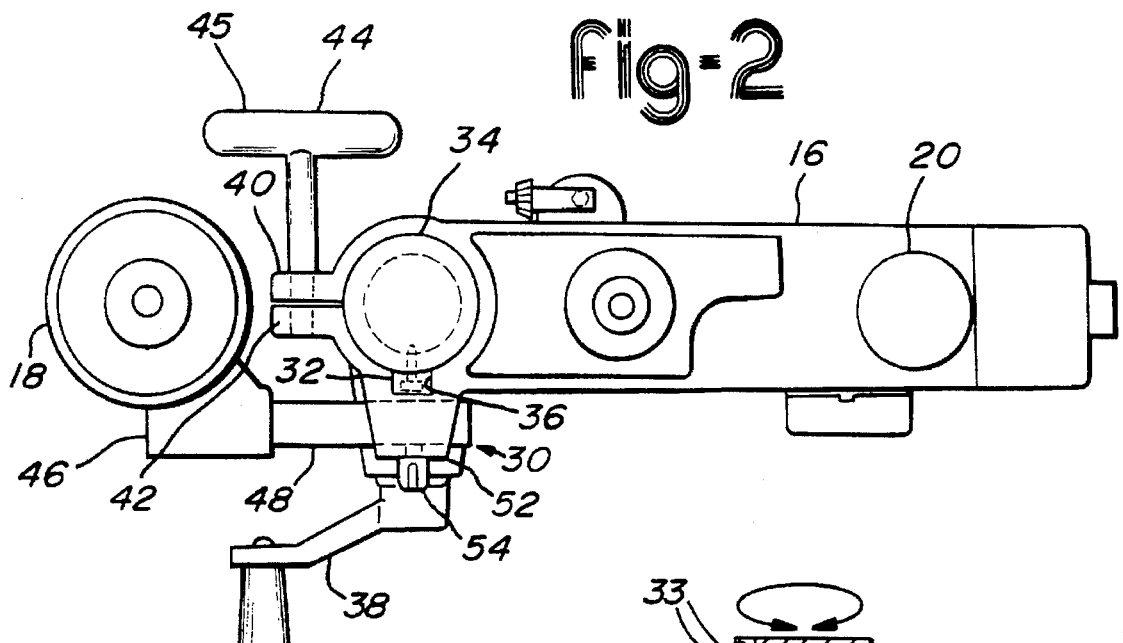
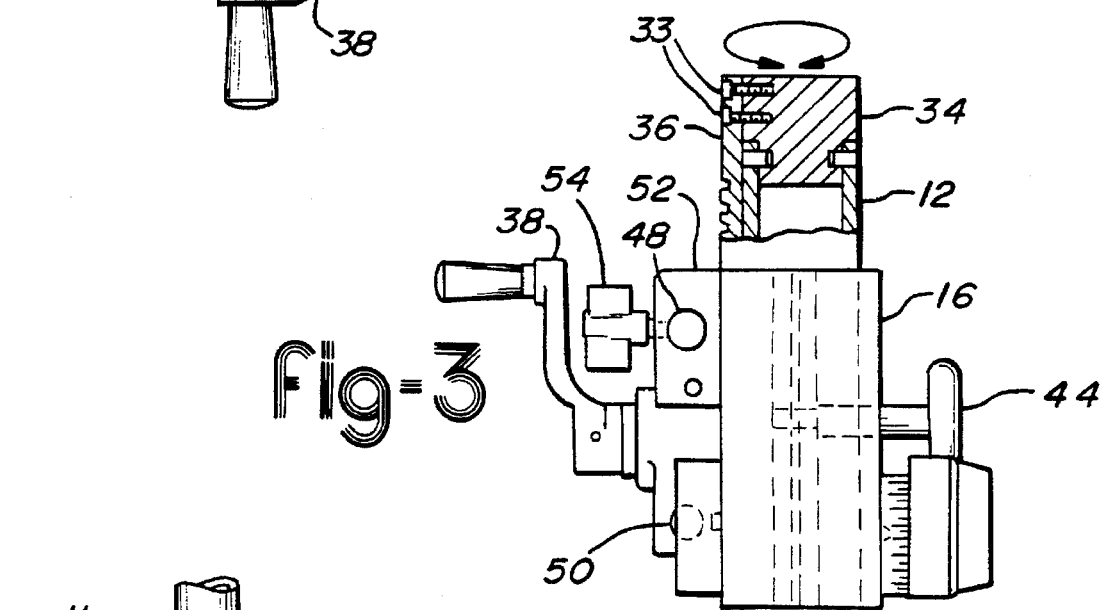
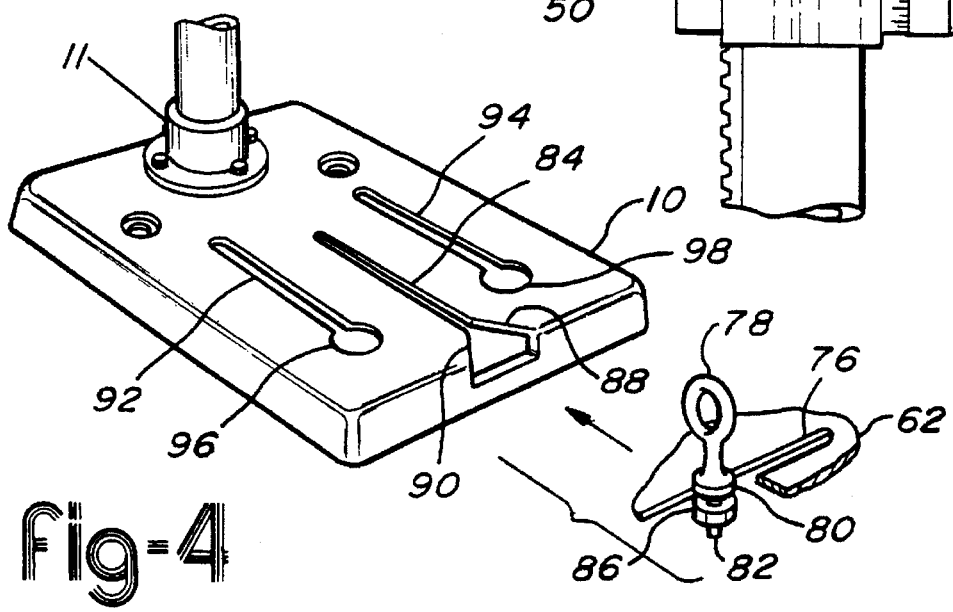

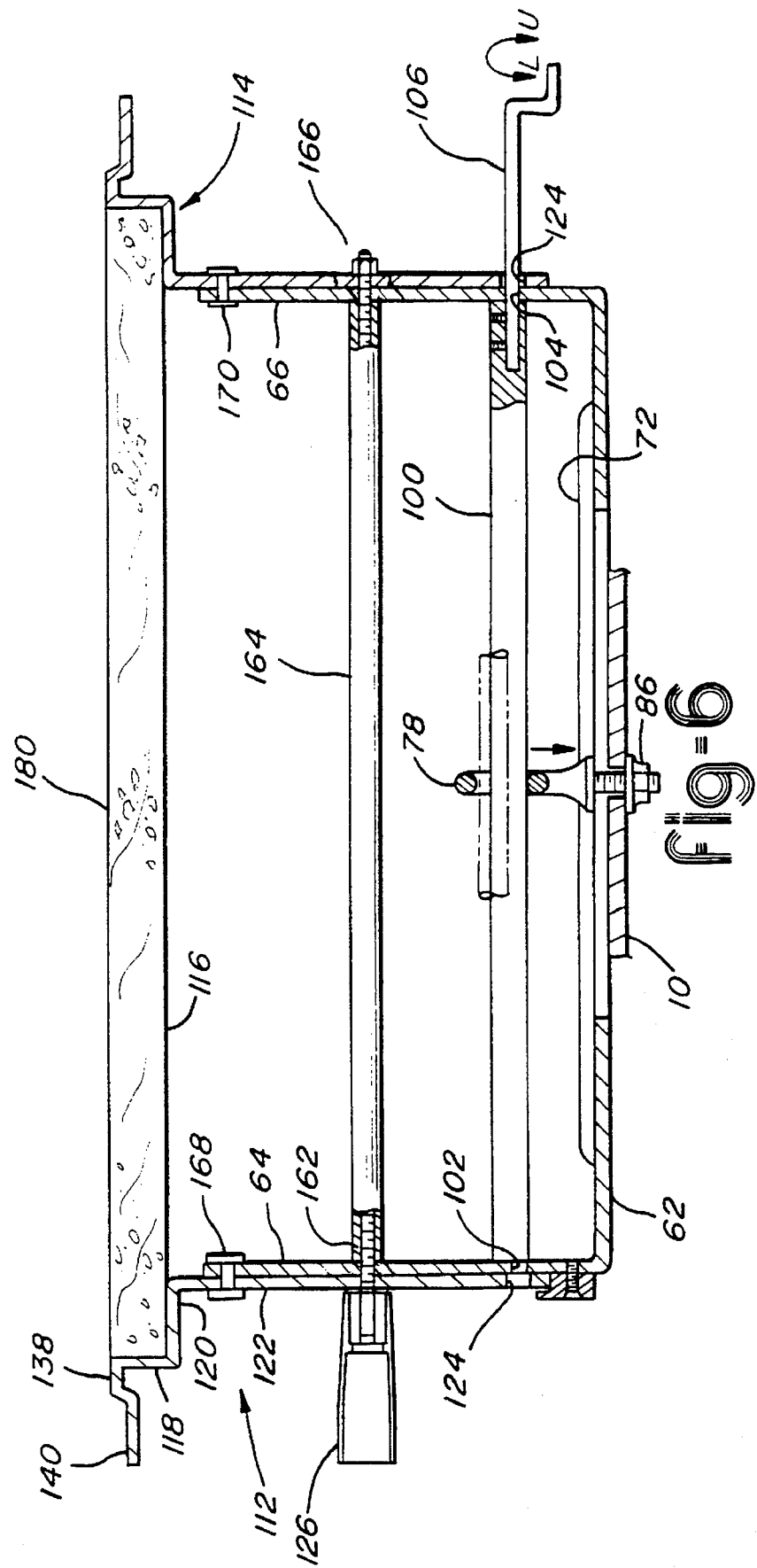

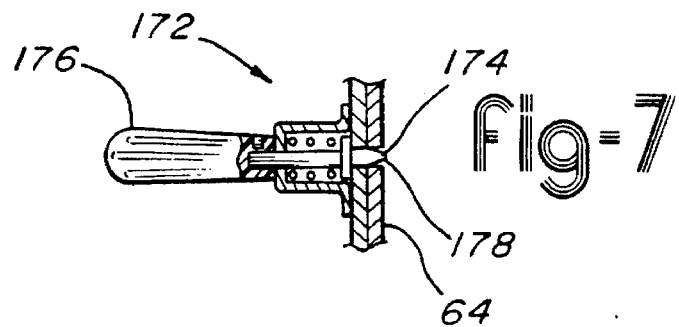
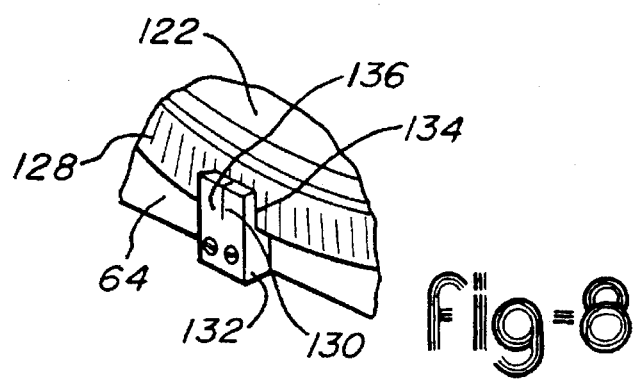
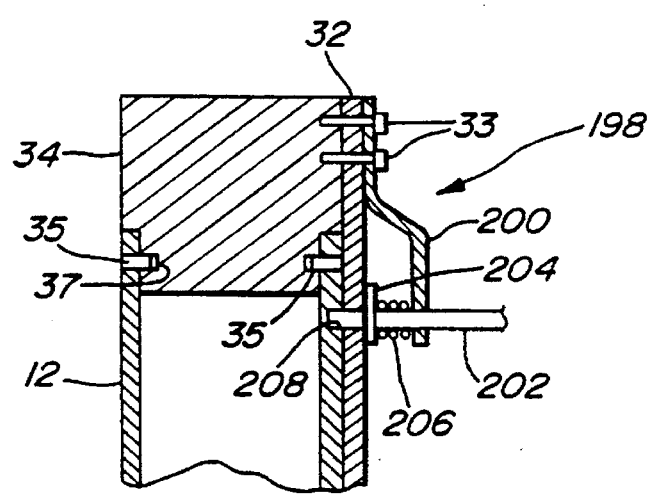

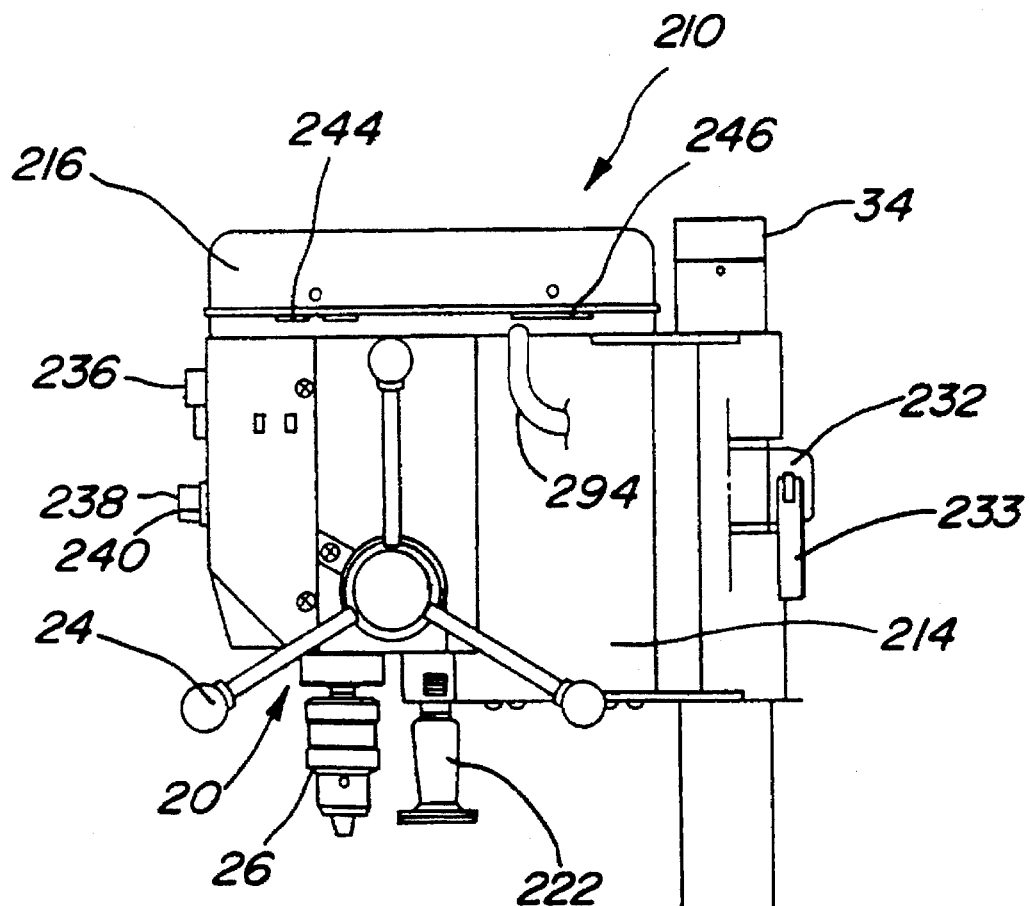
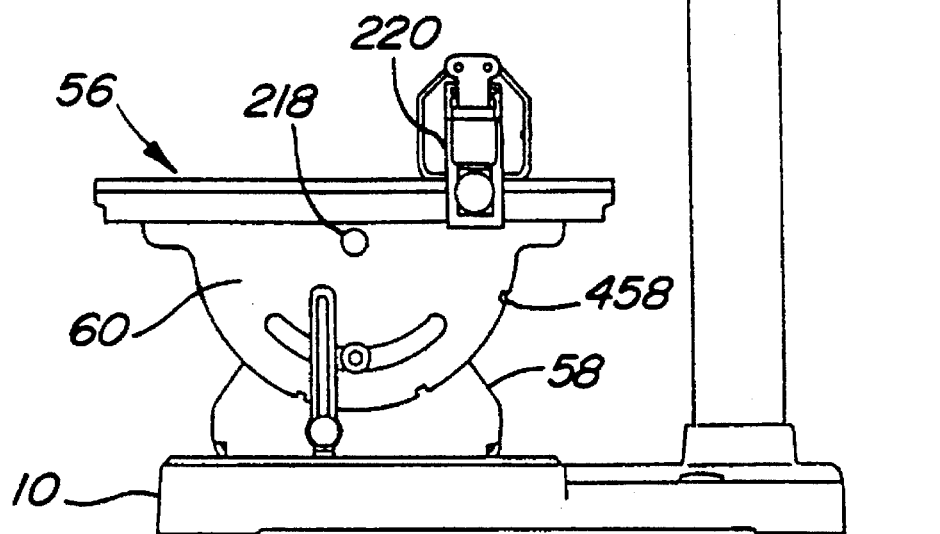
fig-11

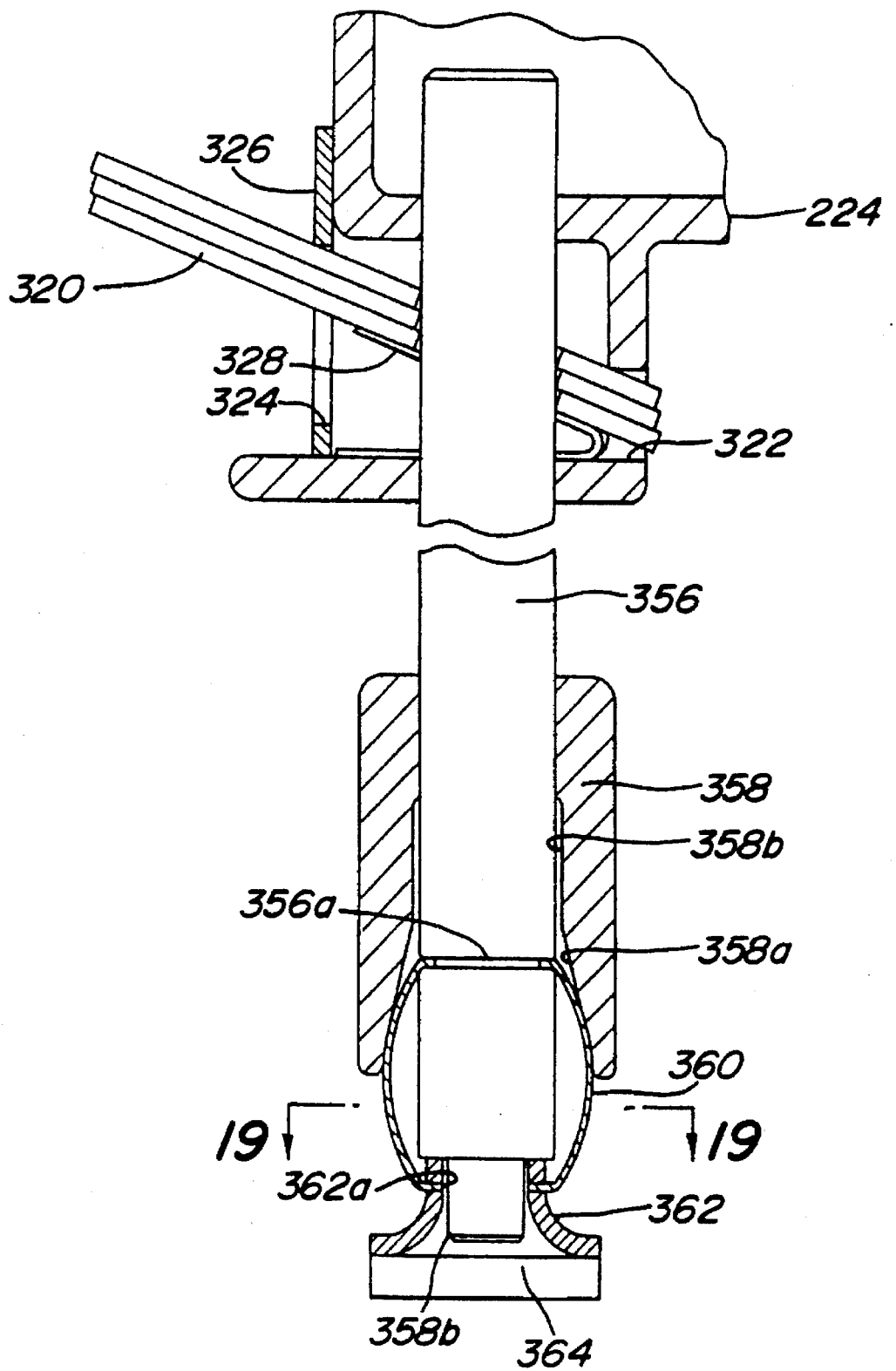

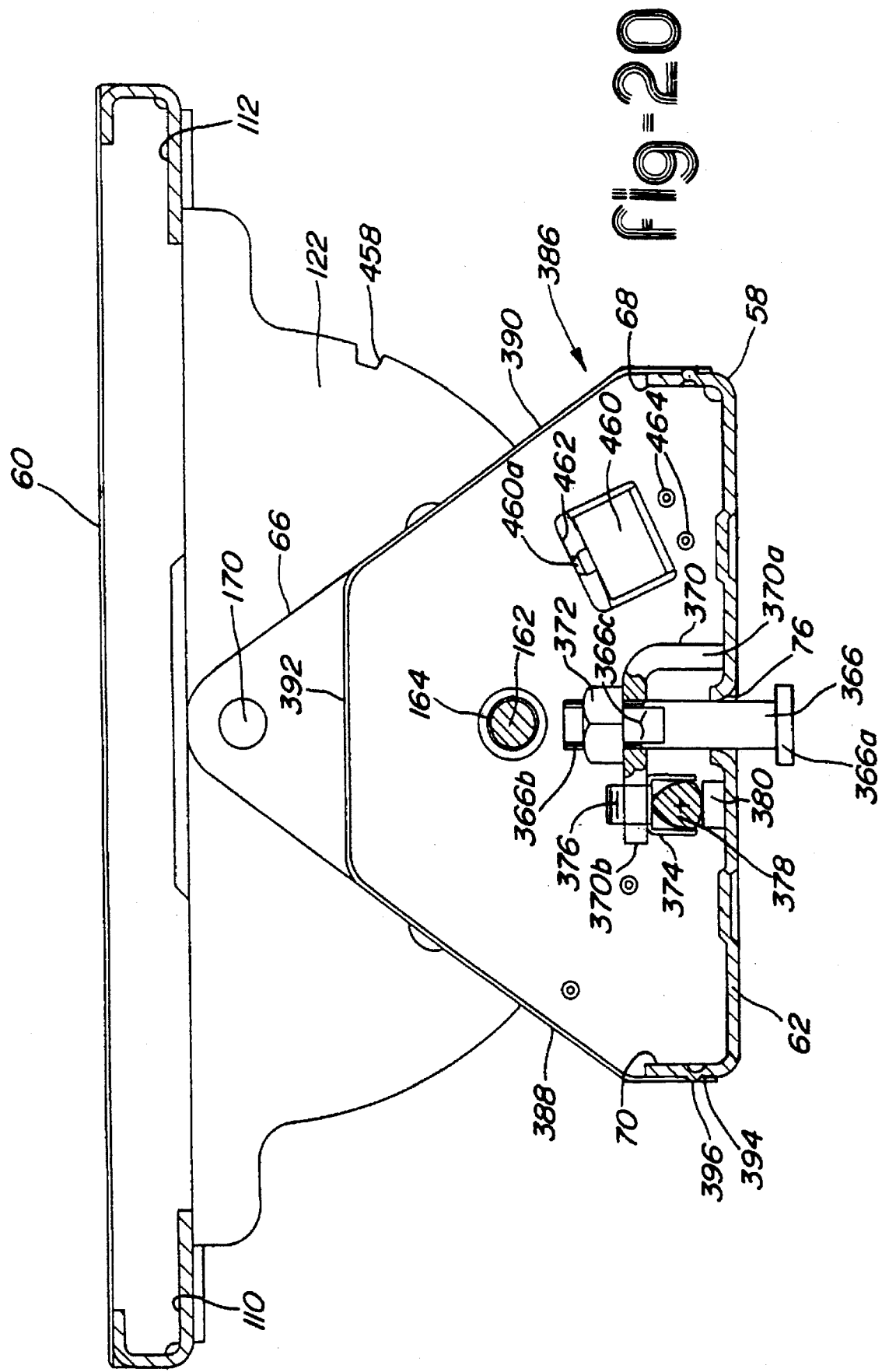

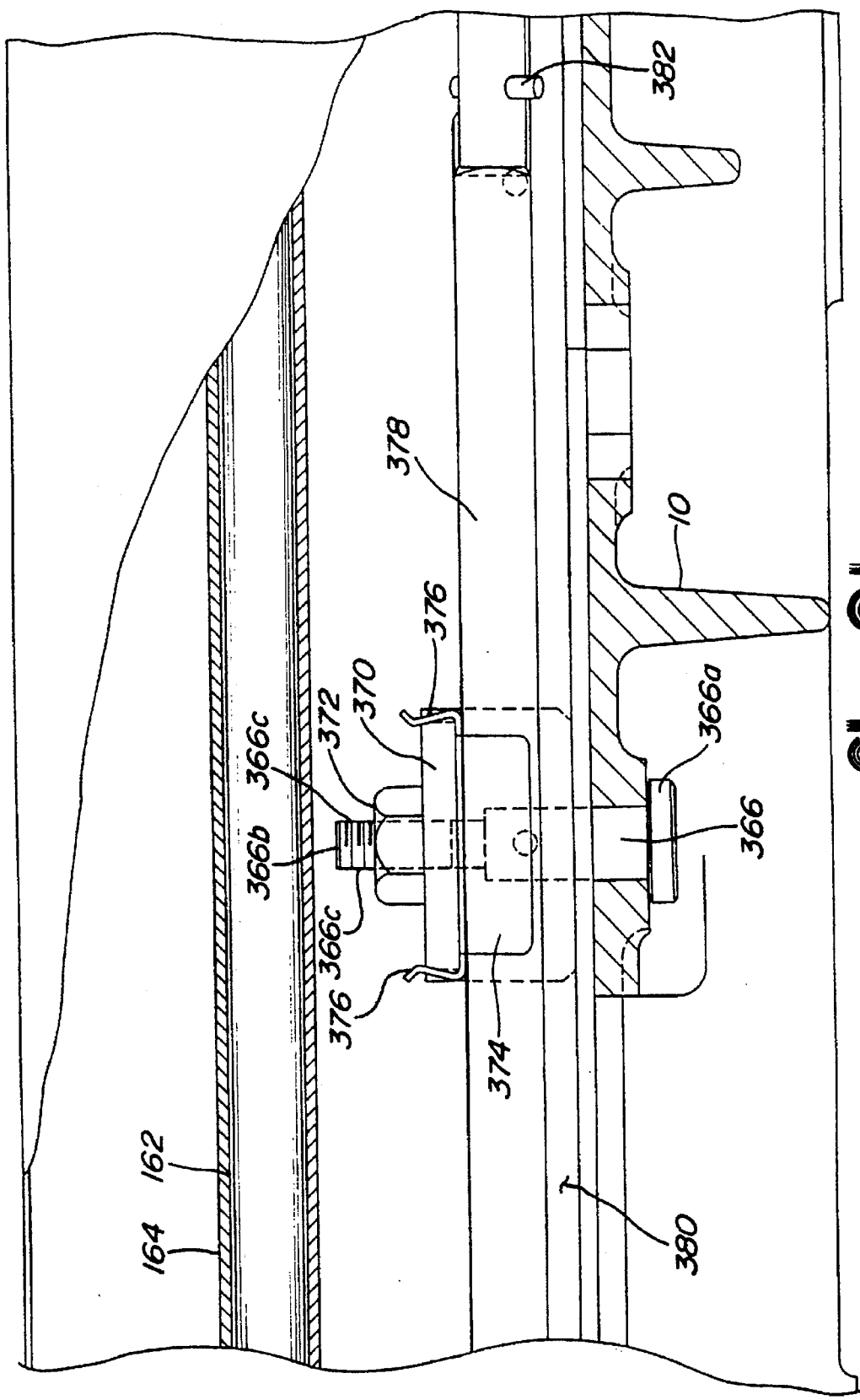

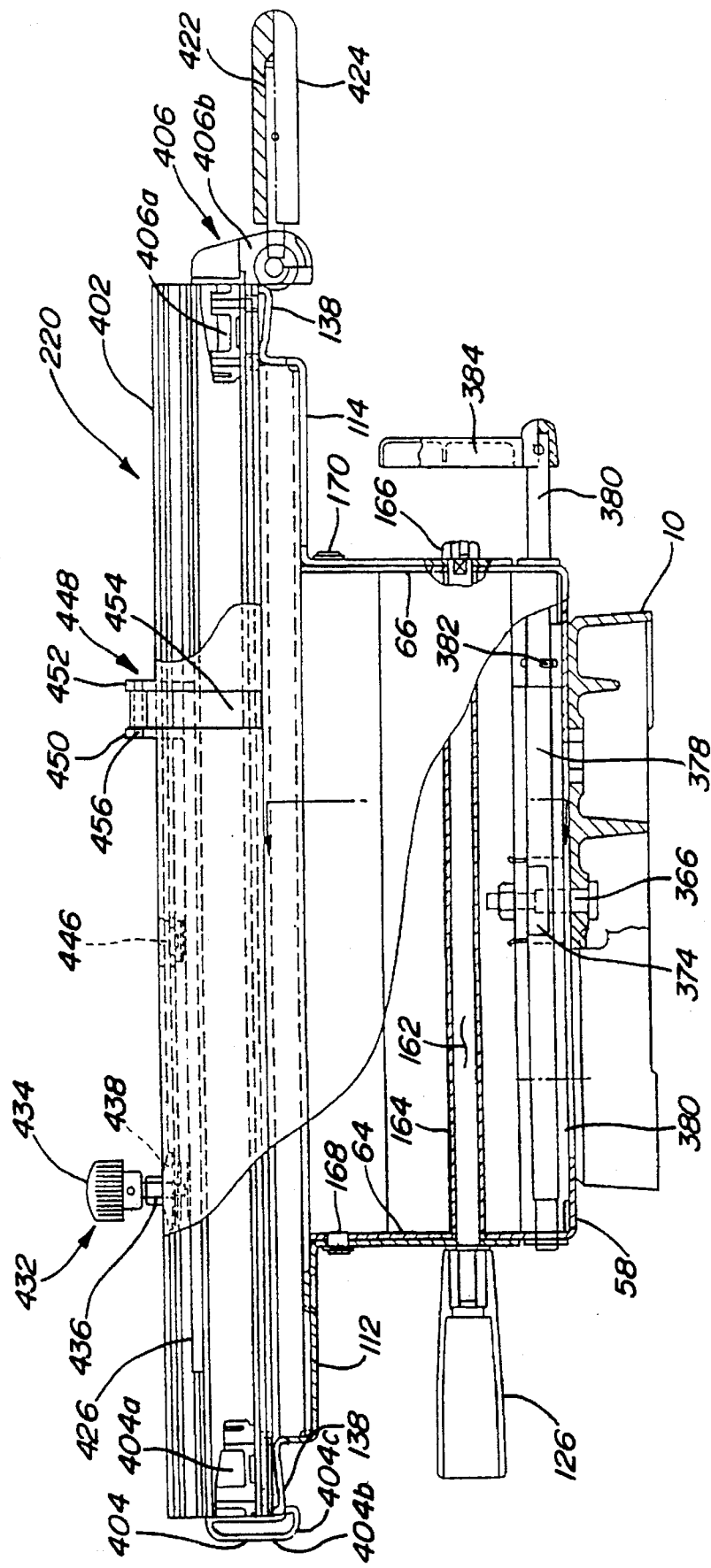

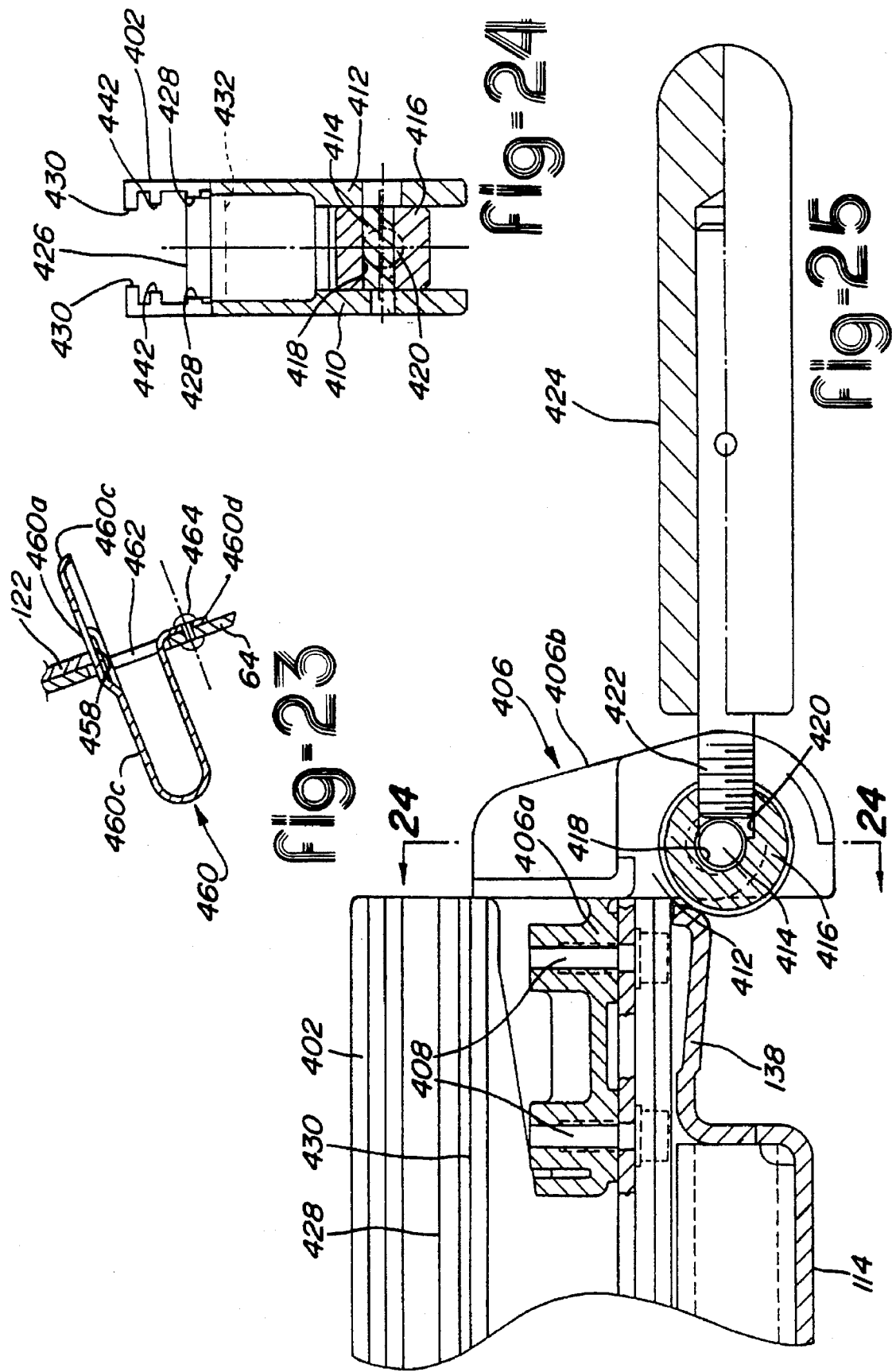

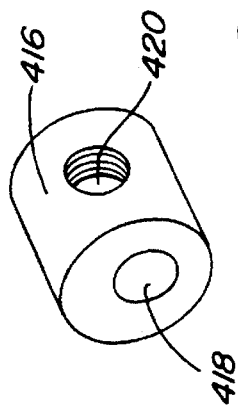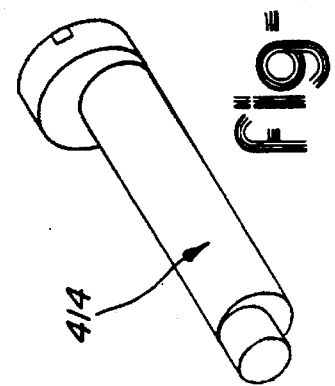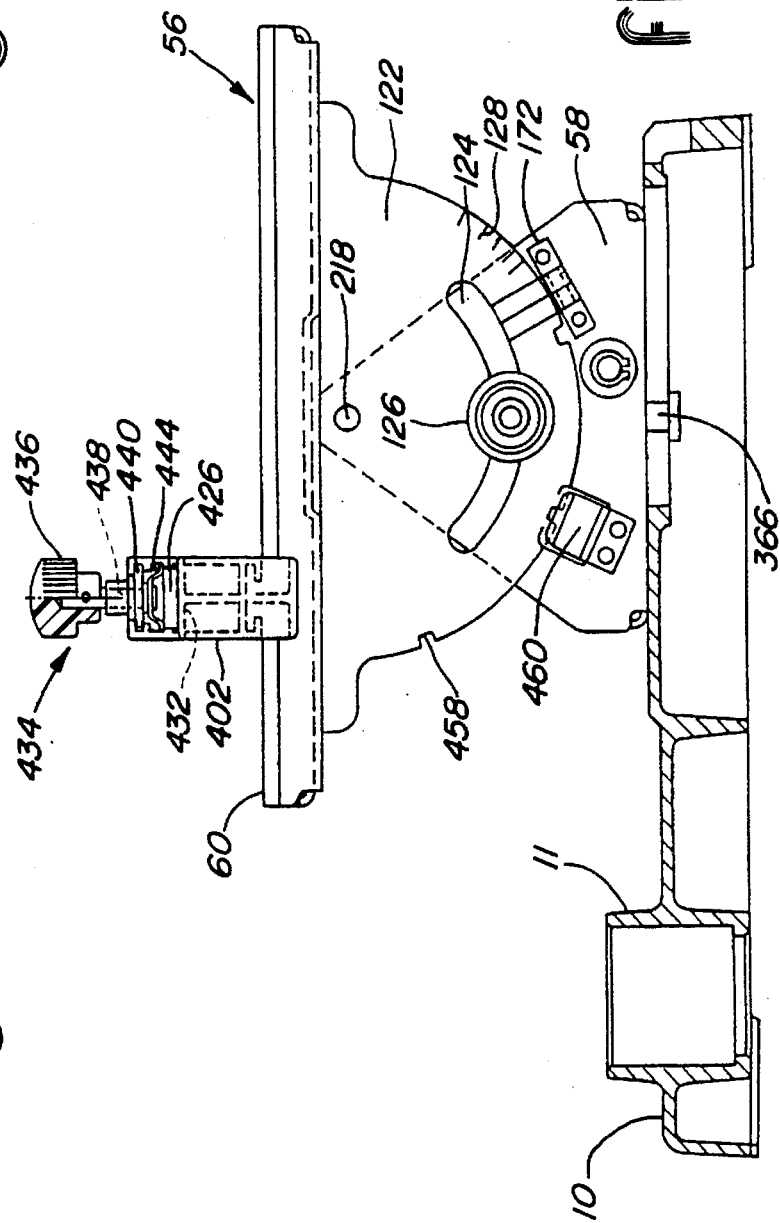

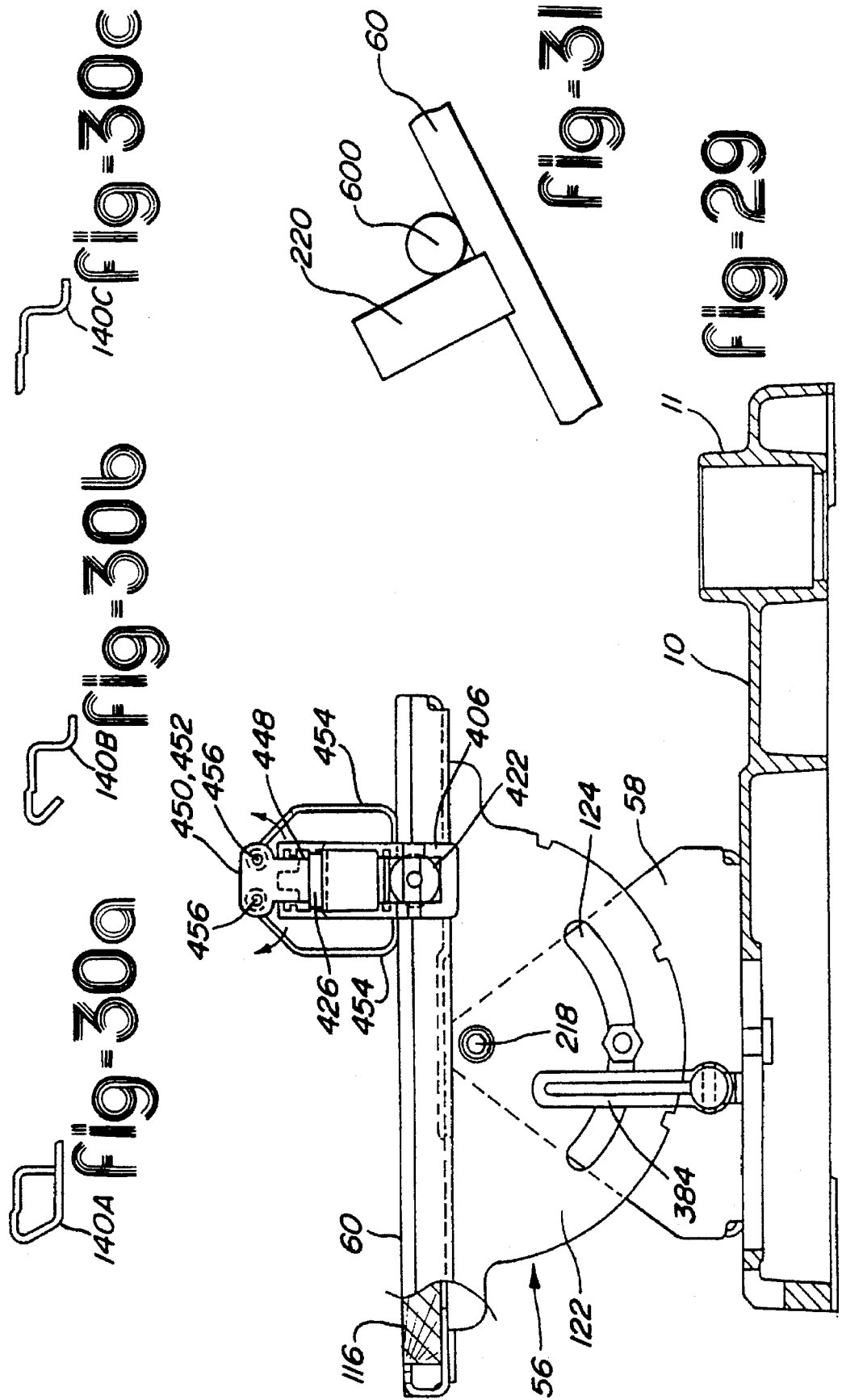

DRILL PRESS HAVING A MOVABLE HEAD AND A TILT TABLE

TECHNICAL FIELD

The invention is related to drill presses and, in particular, to a drill press having a head movable in a vertical direction and a tilt table attachable to the base.

BACKGROUND ART

Drill presses for home use are becoming increasingly popular. Most of these drill presses, however, have limited capabilities and in general, as taught by Werth in U.S. Pat. No. 1,278,407, and Spohn, Jr. in U.S. Pat. No. 4,118,141, the machine head is stationary and the base to which the workpiece is mounted, is moved relative to the head. These drill presses may also include a tilt table mountable on the base, to permit drilling holes in a workpiece at angles other than normal to the base. Most of these tilt tables as taught by Lotta in U.S. Pat. No. 3,382,740 or Kulzer in U.S. Pat. No. 3,782,847 are complex and too expensive for a non-commercial user. To remedy this, N. Engler in his book, "Jigs, Futures and Shop Furniture", RODALE PRESS 1989, p. 71, teaches how to build a drill press table which can perform the required tilt table functions.

Disclosed is a novel drill press in which the drill machine head is movable relative to the base and has an attachable tilt table which is readily affordable by the home user.

SUMMARY OF THE INVENTION

The invention is a drill press having a stationary cast iron base mountable to a work table, a vertical column rigidly attached to the base and a head assembly slidably attached to the column. A rack and pinion mechanism is provided to vertically displace the head assembly along the length of the column. The rack and pinion mechanism is rotatably attached to the top of the column permitting the head assembly to be rotated about the column.

The head assembly has a head box for supporting a driving motor and a quill, and the driving motor and the quill are supported to the head box on opposite sides of the column. The driving motor may be mounted in the head box at a location intermediate the quill and the column. The head box has a work clamp for clamping a workpiece to a tilt table.

The tilt table assembly is attachable to the base. The tilt table assembly has a supporting base, a pivoting frame pivotably attached to the supporting base, and a table plate received in the pivoting frame. The supporting base is made from a single stamped and formed piece of sheet metal and has a substantially flat base portion and a pair of spatially separated vertical trunions. The pivoting frame has a pair of spatially separated longitudinal side members and a pair of transverse end members attached to the ends of the side members to form a generally rectangular frame in which table plate is received. Each end member has a vertically descending sector disk which is adjacent a respective one of the spatially separated trunions. Pivot pins pivotably connect the sector disks to the adjacent trunion permitting the pivoting frame to pivot about an axis parallel to the base portion of the supporting base.

A locking mechanism having a shank passing through a longitudinal slot provided through the base portion of the supporting base and a transverse slot provided in the drill press base and a cam shaft eccentrically mounted between the trunions engages the locking mechanism. Rotation of the eccentrically mounted cam shaft produces a force biasing the supporting base into frictional locking engagement with the top surface of the drill press base. A tilt locking mechanism is provided to lock the pivoting frame to the supporting base at any desired angle. A detent mechanism is also provided to precisely orient the pivoting frame relative to the supporting base at preselected angles.

In the preferred embodiment, the transverse slot provided in the drill press base has a funnel-shaped opening at the front end of the drill press base facilitating the insertion of the shank of the locking mechanism into the drill press base transverse slot.

One advantage of the drill press is that the machine head is movable relative to the base permitting the drill press base to be mounted directly on the top of a work bench.

Another advantage of the drill press is that the funnel-shaped opening to the transverse slot provided in the drill press base makes the mounting of the tilt table to the drill press base simple and convenient.

Still another advantage is that the longitudinal slot provided in the base portion of the supporting base and the transverse slot provided in the drill press base permit the tilt table to be moved in longitudinal and transverse directions as well as being pivotable about the locking mechanism's shank.

Another advantage of the drill press is that the tilt table is made from stamped and formed sheet metal parts making it comparatively less expensive to make. The replaceable ¾" thick particle board table panel provides the necessary support to the bottom surface of the stock being drilled, preventing "tear-out."

Yet another advantage is that the rack is rotatably mounted to the top of the column permitting the machine head to rotate about the column as well as being vertically displaced.

These and other advantages of the drill press and the associated tilt table assembly will become more apparent from a reading of the specification in conjunction with the drawings.

BRIEF DESCRIPTION OF THE DRAWINGS

FIG. 2 is a partial top view of the head assembly's frame mounted to the column;

FIG. 3 is a partial front view of the head assembly's frame mounted to the column;

FIG. 4 is a partial perspective view showing the details of the drill press base;

FIG. 6 is a cross-sectional side view of the tilt table assembly;

FIG. 7 is a partial cross-sectional view of the detent mechanism;

FIG. 8 is a partial perspective view showing the details of an alternate embodiment of the indicator block;

FIG. 9 is a partial cross-section showing the details of the detent mechanism;

FIG. 11 is a right side view of the alternate embodiment;

FIG. 17 is a partial cross-section of a third embodiment of the clamping device in an unclamped state;

FIG. 20 is a side cross-sectional view showing the details of an alternate embodiment of the locking mechanism;

FIG. 21 is a front cross-sectional view of the alternate embodiment of the locking mechanism;

FIG. 22 is a partial side cross-sectional view of the tilt table showing the details of the fence and pivot locking mechanism;

FIG. 23 is a partial cross-sectional view showing the details of an alternate embodiment of the angle detect mechanism;

FIG. 24 is a front cross-sectional view of the fence;

FIG. 25 is an enlarged side cross-sectional view of the fence showing the locking mechanism;

FIG. 26 is a perspective view of the eccentric pin;

FIG. 27 is a perspective view of the eccentric cam;

FIG. 28 is an end view showing the details of the slide plate locking mechanism;

FIG. 29 is an end view showing the details of the stop block;

FIGS. 30A, 30B and 30C show alternate configurations of the lip 140 of the pivoting frame; and FIG. 31 is an explanatory view when a round bar is mounted on the table.

DETAILED DESCRIPTION OF THE INVENTION

Figure 1:
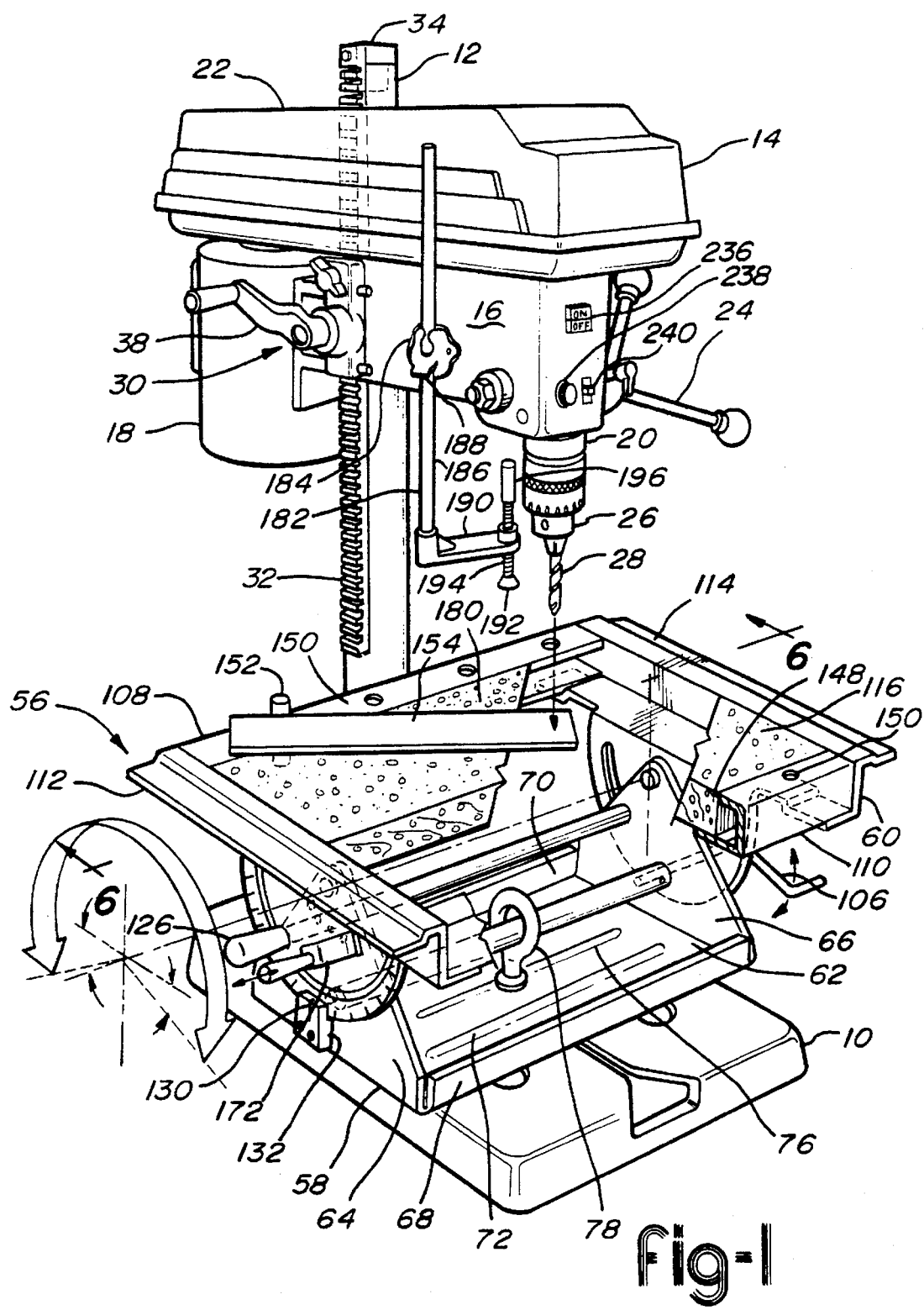
FIG. 1 is a perspective view of the drill press assembly.

The details of the drill press assembly are shown in FIG. 1. The drill press has a drill press base 10 which is mountable to a table or work bench. A column 12 is fixed to the drill press base 10 and extends upward therefrom. A drill head assembly 14 is attached to the column 12 and is rotary displaceable about the column 12 and axially displaceable relative to the drill press base 10. The drill head assembly has a frame 16 which supports an electric motor 18 and a quill 20. The rotary output of the electric motor 18 is connected to the quill 20 by a speed change mechanism, not shown, which permits the operator to adjust the rotational speed of the quill as desired. A cover 22 encloses the rotary output of the electric motor 18 and the speed change mechanism in a conventional manner. The cover 22 has a column clearance aperture permitting the head assembly to be raised and lowered without interference. A hand wheel 24 enables the operator to vertically displace the quill 20 relative to the frame 16. A suitable chuck 26 is carried at the end of the quill 20 for receiving the shanks of various tools and bits, such as drill bit 28.

A rack and pinion mechanism 30 provides for the vertical displacement of the drill head assembly relative to the drill press base 10. The rack 32 is fixedly attached to a cap 34 by screws 33 and rotatably mounted to the top of the column 12 as shown in FIG. 3. A pair of diametrically opposite pins 35 attached to the column 12 are slidably received in an annular slot 37 provided in the cap 34 as shown in FIG. 9. The pins 35 prohibit an inadvertent axial displacement of the cap 34 from the top of the column 12. The rack 32 extends a substantial distance along the length of the column 12 and passes through a mating slot 36 provided in the frame 16 adjacent to the column 12 as shown in FIG. 2. A crank 38 is rotatably connected to a pinion which engages the rack 32 such that a rotation of the crank 38 will raise and lower the head assembly 14 in a known manner.

An indexing mechanism 198 as shown in FIG. 9 may be provided to lock the drill head assembly 14 in a predetermined position. In the preferred embodiment, the drill head assembly 14 is locked in a position directly above the center of the base 10. The indexing mechanism consists of a bracket 200 fixedly attached to the rack 32 by screws 33. An indexing pin 202 is slidably received through axially aligned apertures provided through the bracket 200 and the rack 32. The indexing pin has an annular collar 204 which acts as a spring seat for a coil spring 206 disposed between the collar 204 and the bracket 200. An indexing bore 208 is provided in the column 12 which receives the indexing pin 202 when the drill head assembly 14 is centrally located over the base 10. The spring 206 produces a force biasing the index pin 202 into the indexing bore 208 when they are aligned with each other. The distal end of the indexing pin 202 may be grasped by an operator and manually removed from the index bore 208 permitting the drill head assembly to be freely rotated about the column 12.

The frame 16 has a split C-section circumscribing the column 12 and a pair of clamping flanges 40 and 42 radially extending therefrom as more clearly shown in FIG. 2. A locking member 44 threadably received in a threaded bore provided in clamping flange 42 through a clearance aperture provided in clamping flange 40. A knob 45 is provided for the manual rotation of the locking member 44. The rotation of the locking member 44 in a first direction will clamp the frame 16 to the column 12 while rotating the locking mechanism 44 in the reverse direction will release the frame 16 from the column 12 permitting the head assembly to be rotated relative to the column 12 and/or to be raised or lowered by the crank 38. An ON/OFF switch 236, a speed control knob 238 and a light switch 240 are mounted on the face of the frame 16 opposite the split C-section circumscribing the column 16.

Because the top of the rack 32 is rotatably mounted on the top of the column 12 and is captivated in the slot 36 of the frame 16, the rack 30 will rotate with the head assembly 14 as it is rotated about the column 12. The pinion mechanism 30 holds the rack 32 against the column 12.

The motor 18 is mounted on an adjustable motor mounting bracket 46 which is slidably attached to the frame 16 by a clamping rod 48 and a parallel follower rod 50. The clamping and follower rods 48 and 50 have one end attached to the mounting bracket 46 and their opposite ends are received in mating apertures provided in a radially extending boss 52 of the frame 16. A lock knob 54 threadably received in the boss 52 can be rotated to lock the clamping rod 48 to the frame 16. Rotating the locking knob in the reverse direction unlocks the clamping rod 48 and allows the motor 18 to be displaced relative to the quill 20 to tighten or loosen a belt (not shown) which rotatably connects the quill 20 to the motor 18.

A tilt table assembly 56 is mountable to the base 10 directly below the quill 20. The tilt table assembly 56 has a supporting base 58 which mounts directly to the drill press base 10 and a pivoting frame 60. The supporting base 58 has a substantially flat base portion 62 and two spatially separated upright trunions 64 and 66. The supporting base 58 is preferably made from a single stamped and folded 3.2 mm thick steel plate. In addition to the trunions 64 and 66, the supporting base 58 has a pair of longitudinal side walls 68 and 70 and a pair of longitudinal stiffener ribs 72 and 74 which strengthen the base portion 62. A cover 386 such as shown in FIG. 20 may be attached to the longitudinal side walls 68 and 70 to enclose the lower portion of the supporting base.

A longitudinal slot 76 is provided through the base portion 62 and receives therethrough a cam activated locking member such as an eyebolt 78. As shown more clearly in FIG. 4, the eyebolt 78 has a shoulder portion 80 which engages the upper surface of the base portion 62 and a threaded shank 82 which extends through the longitudinal slot 76 of the supporting base 58 and through a transverse slot 84 provided in the drill press base 10. A nut 86 is threaded onto the threaded shank of the eyebolt 78 and is positioned to permit the eyebolt 78 to be slidably received in the transverse slot 84 of the base 10. The nut 86 is preferably a nylon nut which facilitates the sliding of the eyebolt 78 in the transverse slot 84 of the drill press base 10.

The ends 88 and 90 of the transverse slot 84 adjacent to a forward edge of the drill press base 10 are angled outwardly to form a "V" shaped or funnel-shaped entrance to the transverse slot 84. This permits a user to insert the eyebolt 78 and the nut 86 attached to the end thereof into the transverse slot 84 with minimal effort as compared to the prior art which required the insertion of the eyebolt and nut through an aperture obscured from view by the tilt table 56 itself. The drill press base 10 also has a pair of transverse keyhole slots 92 and 94 disposed on opposite sides of the transverse slot 84. Circular apertures 96 and 98 at the ends of the keyhole slots 92 and 94, respectively, are dimensioned to receive standard ½ inch carriage bolts for clamping various items, including vices or other metal working devices directly to the drill press base 10. This eliminates the need for milling machine hold-down "T" blocks which are not always readily available to a user. In contrast, standard ½ inch carriage bolts are readily available in almost every neighborhood hardware store. The base 10 also has a collar 11 provided near its rear end which receives the lower end of the column 12. This collar may be formed integral with the drill press base as shown in FIGS. 28 and 29 or be an independent element bolted to the drill press base 10 as shown in FIG. 4.

The supporting base 58 is clamped to the drill press base 10 by means of a longitudinal camshaft 100 extending through the eye of the eyebolt 78 and between the trunions 64 and 66. The camshaft 100 is eccentrically mounted to the trunions 64 and 66 by means of offset pivot shafts received in a pair of camshaft apertures 102 and 104 as more clearly shown in FIGS. 5 and 6. The camshaft 100 has a locking position in which the camshaft 100 engages the inner surface of the eye of the eyebolt 78 and is rotatable by means of a crank 106 to an unlocked position in which it is disengaged from the inner surface of the eyebolt 78. In the locked position, the engagement of the camshaft 100 with the upper inner surface of the eyebolt 78 raises the eyebolt 78 causing the nut 86, threaded on the thread shaft 82, to engage the bottom surface of the base 10 and produce an equal and opposite force acting on the trunions 64 and 66. The force exerted on the trunions 64 and 66 will press the base portion 62 of the supporting base 58 against the top surface of the drill press base. This frictionally locks the supporting base 58 to the drill press base 10.

In the unlocked position, the camshaft 100 is disengaged from the cam activated locking member permitting the supporting base 58 to be moved longitudinally relative to the drill press base 10 within the limits of longitudinal slot 76 and to be moved transversely relative to the drill press base within the limits of the transverse slot 84. The supporting base 58 may also be rotated or pivoted relative to the drill press base 10 about the eyebolt 78. This provides the tilt table 56 with three (3) degrees of freedom in the horizontal plane defined by the top surface of the drill press base 10. The single tilt table locking mechanism consisting of eyebolt 78, nut 86 and camshaft 100 is capable of locking the tilt table 56 to the drill press base in all positions.

An alternate embodiment of the locking mechanism is shown in FIGS. 20-22. This alternate embodiment has a lock bolt 366 having a head 366a and a threaded portion 366b, which is received through the longitudinal slot 76 of the pivoting base 58 and an aperture 368 provided in an L-shaped bracket 370. A nut 372 is threaded onto the threaded portion 366b as shown. The vertical portion 370a of the L-shaped bracket engages the flat base portion 62 of the pivoting base while the horizontal portion 370b extends over the slot 76 and has the aperture 368 in which the threaded portion 366b of the lock bolt 366 is received. The threaded portion 366b has opposing flat sides 366c and the aperture 368 has corresponding flat edges which engage the opposing flat sides of bolt 366 and prevent the bolt 366 from rotating relative to the L-shaped bracket 370 when the nut 372 is threaded onto the bolt 366.

A U-shaped guide 374 is attached to the horizontal portion 370b of the L-shaped bracket 370 which straddles an eccentric cam shaft 378 mounted between the trunions 64 and 66 of the pivoting base 58. The U-shaped guide 374 is attached to the horizontal portion 370b of the L-shaped bracket 370 by spring clips 376 which engage opposite edges to the L-shaped bracket 370. The guide 374 moves with the bolt 366 and the L-shaped bracket 370 along the length of the longitudinal slot 76.

The camshaft 378 has an elliptical cross-section and can be rotated between a locked position in which the elliptical portion of the camshaft 378 raises the end of the horizontal portion 370b of the L-shaped bracket 370 which in turn lifts the bolt 366 a distance sufficient for the head 366a of the bolt 366 to forceably engage the bottom surface of the drill press base 10 as shown in FIG. 21. The camshaft 378 may also be rotated to an unlocked position in which the elliptical portion of the camshaft 378 is disengaged from the L-shaped lock plate 370. As a result, the end of the horizontal portion 370b of the L-shaped bracket is lowered, which, in turn, lowers the bolt 366 a distance sufficient for the head 366a to be disengaged from the bottom surface of the drill press base 10. This permits the tilt table 56 to be longitudinally moved relative to the drill base 10 within the limits of longitudinal slot 76 to be traversely moved with respect to the drill base 10 within the limits of the transverse slot 84 of the drill base 10, to be rotated about the bolt 266 or to be removed from the drill base 10. A spacer plate 380 is attached to the base portion 62 of the pivoting base 58 directly below the camshaft 378 and prevents the camshaft 378 from bending when camshaft 378 engages the bracket 370 and the bracket 370 is intermediate its opposite ends. The camshaft 378 has a stop pin 382 which engages the opposite sides of the spacer plate 380, limiting the rotation of the camshaft between the locked position and the unlocked position.

A portion of the camshaft 378 passes through the trunion 66 of the supporting base 58 as shown in FIG. 22 and has a lever 384 pivotably attached to its end. The lever 384 facilitates the rotation of the camshaft 378. In the preferred embodiment, the lever 384 is in an upright position as shown in FIG. 22 to lock the tilt table 56 to the drill press base 10. From this position, the lever 384 is rotated to a downward position to unlock the tilt table 56 from the drill press base 10.

As shown in FIG. 20, a tent-shaped cover 386 may be attached to the longitudinal sidewalls 68 and 70 of the supporting base 58 between the trunions 64 and 66 to prevent drill chips, dust or other materials from collecting in the bottom of the supporting base 58. The cover 386 has side portions 388 and 390 which follow the contour of the edges of trunions 64 and 66 to a location below the pivot pins 168 and 170 and a top portion 392 which bridges the side portions. The side portions 388 and 390 are resiliently biased toward each other and have slots 394 which receive raised lugs 396 stamped into the longitudinal sidewalls 68 and 70.

The pivoting frame 60 consists of a pair of longitudinal side members 108 and 110, a pair of end members 112 and 114 attached to the side members and a table plate 116. The end members 112 and 114 are substantially identical. Each end member 112 and 114 has a generally horizontal portion 120 forming a seat for the table plate 116 and a vertical portion 118. The vertical portion 118 has a height substantially equal to the thickness of the table plate 116 and extends upwardly from the outside edge of the horizontal portion 120 to form an end guide for the table plate 116 as shown in FIGS. 1 and 6.

Figure 5:
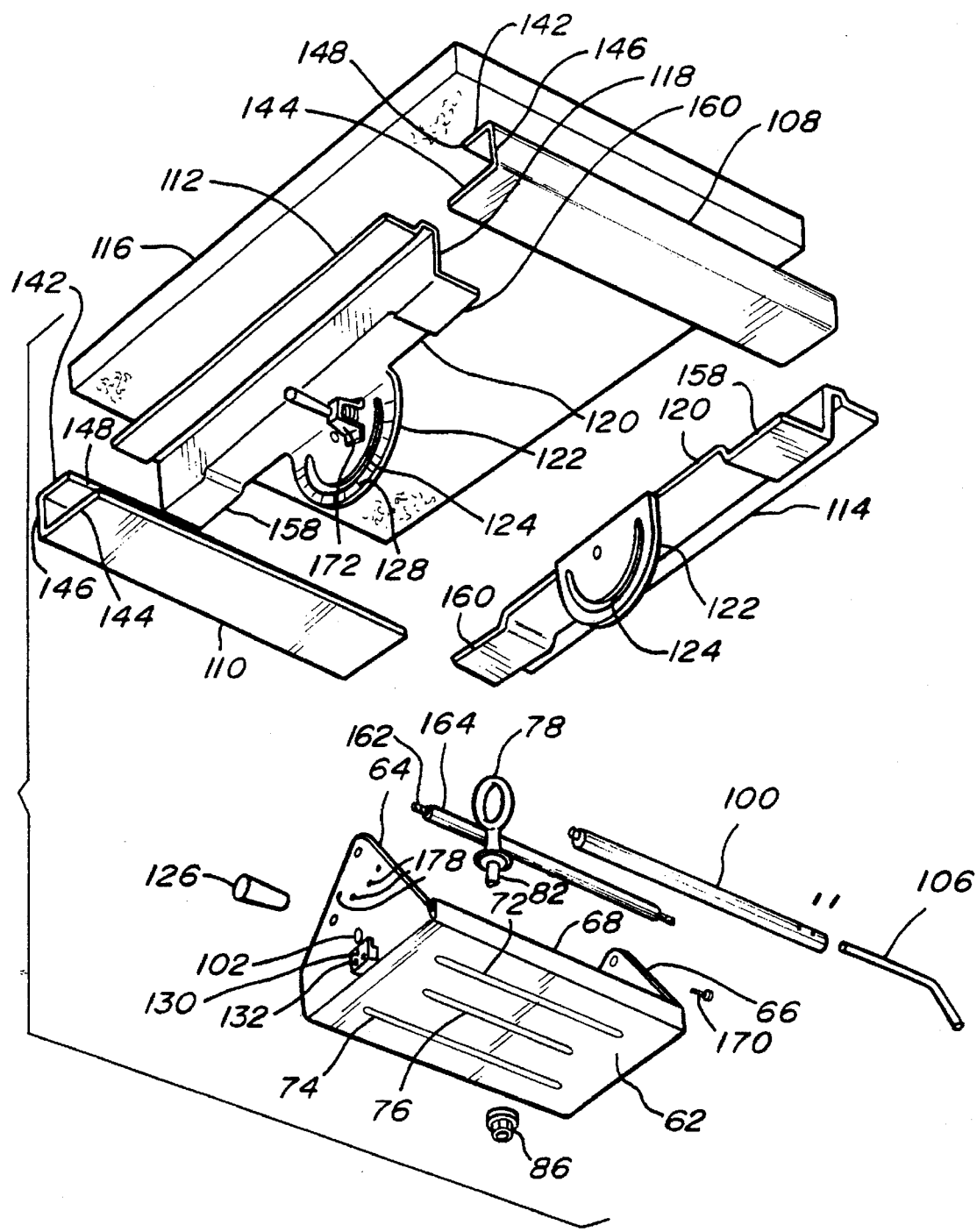
FIG. 5 is an exploded view of the tilt table assembly.

A sector disk 122 formed at the inside edge of the horizontal portion 120 extends downwardly, as shown, and has an arcuate slot 124 provided therethrough. The arcuate slot 124 of the sector disk of end members 112 and 114, respectively, serves as clearance slots for a locking bolt 162. The locking bolt 162 is threaded at both ends. A locking knob 126 is threadably received at one end while a nut 166 is threadably received at the other end. The locking bolt is held non-rotatably in an opening provided in the trunion 66. A sleeve 164 circumscribes the lock bolt 162 between the trunions 64 and 66. The arcuate slot 124 of the sector disk of end member 114 is also a clearance slot for the crank 106 of the camshaft 100. The sector disk of the end member 112 has scribed or embossed thereon an angle scale 128 as shown in FIGS. 1 and 5. This angle scale, as shown in FIGS. 1 and 5, is aligned with a reference line 130 inscribed on an indicator block 132 attached to the trunion 64. The reference line 130 indicates on the angle scale 128 the angular displacement of the pivoting frame 60 relative to the supporting base 58. As shown in FIG. 8, the reference line 130 may alternatively be a scribe line on the inner surface 134 of a transparent plastic L-shaped block 136 attached to the trunion 64. In this embodiment, the reference line 130 overlays the scale 128 making the angular positioning of the pivoting frame 60 more accurate.

The end members 112 and 114 also have an upper flange portion 138 extending outwardly in a horizontal direction away from the top edge of the vertical portion 118. The upper flange 138 has a lip 140 adjacent to its outer edge. The lip 140 may be depressed as shown to permit the attachment of an indicator scale (inch scale) to the end members 112 and 114 in a region where they are protected from a fence or other device mounted on the pivoting frame 60. Alternately, the lip 140 may have an upturned edge as shown in FIG. 25 or may have any of the configurations shown in FIGS. 30A, 30B and 30C.

The longitudinal side members 108 and 110 have inwardly extending upper and lower portions 142 and 144, respectfully connected by a substantially vertical portion 146. The lower portion 144 extends inwardly a substantially greater distance than the upper portion 142 and forms a seat for the table plate 116 as shown in FIG. 1. The upper portion 142 is spaced from the lower portion 144 so that its top surface is flush with the top surface of the table plate 116. The inner edges 148 of the upper portion 142 of the longitudinal side members 108 and 110 form an edge guide positioning the table plate 116 within the pivoting frame 60 as shown in FIG. 1.

The upper portion 142 of the longitudinal side members 108 and 110 may also include a series of spaced apertures 150 through which may be received at least one peg 152. The peg 152 may be conveniently used to inhibit the rotation of a workpiece 154 due to a torque imparted to the workpiece 154 by a rotating tool.

The lower portions 144 of the longitudinal side members 108 and 110 are preferably welded to the horizontal portion 120 of the end members 112 and 114. End portions 158 and 160 of the horizontal portions 120 are depressed so that when the lower sections 144 of the longitudinal side members 108 and 110 are welded to the horizontal portion 120 of the end members, the upper surfaces of horizontal portions 120 of the end members lie in substantially the same plane as the upper surfaces of the lower portions 144 of the side members. This arrangement provides uniform support for the table plate 116 along all four edges of the pivoting frame 60, reducing the flexing of the table plate 116 during a drilling or machining operation.

As previously described, the locking bolt 162 passes through the arcuate slot 124 of the sector disk 122 of the end member 112. The end of the locking bolt 162 is threaded and threadably receives the locking knob 126 at one end. The sleeve 164 circumscribes the locking bolt 162 between the trunions 64 and 66. The locking knob 126 has a shoulder which engages the sector disk 122 of the end member 112 on the side opposite trunion 64. The locking bolt 162 passes through the arcuate slot 124 in the sector disk of the end member 114 and the nut 166 is threaded onto the opposite end of the locking bolt 162. The face of nut 166 is larger than the arcuate slot 124 and engages the sector disk 122 on the side of the arcuate slot 124 opposite the trunion 66.

At least one end of the lock bolt 162 has a non-circular cross-section such as a square cross-section which is received in a mating non-circular hole provided in the trunion, such as the trunion 66 which inhibits the rotation of the locking bolt 162. As the locking knob 126 is rotated, the locking bolt 162 will be displaced a short distance to the left as shown in FIG. 6. With the displacement of the locking bolt 162, the head of the nut 166 will force the sector disk 122 of the end member 114 into locking frictional engagement with the trunion 66. At the same time, the shoulder on the locking knob 126 will force the sector disk of the end member 112 into locking frictional engagement with the trunion 64, thus locking the pivoting frame 60 to the pivoting base 58. The sleeve 164 prevents the trunions 64 and 66 from being displaced toward each other as the locking knob 126 is rotated to lock to sector disks to the trunions.

A first pivot pin 168 pivotably connects the sector disk 122 of the end member 112 to the trunion 64 while a second pivot pin 170 pivotably connects the sector disk 122 of the end member 144 to the trunion 66. The first and second pivot pins 168 and 170 permit the pivoting frame 60 to be tilted relative to the supporting base 58 about an axis parallel to the top surface of the base portion 62 and the drill press base 10.

An angle detent mechanism 172 is mounted on the sector disk 122 of the end member 112. The angle detent mechanism 172 has a spring-biased tapered pin 174 which is selectively insertable into one of a series of apertures 178 provided in the trunion 64. A handle 176 permits the spring-loaded pin 174 to be withdrawn from the apertures 178 to permit the pivoting frame 60 to be pivoted about the pivot axis defined by pivot pins 160 and 162. The apertures 178 are arranged so that when the spring-loaded pin 174 is received in one of them, the top surface 180 of the tilt table assembly 56 is at a predetermined angle relative to the top surface of the drill press base 10. As an example, the apertures 178 may be located so that the spring-loaded pin 174 will be received in one of the apertures when the top surface 180 of the tilt table assembly 56 is parallel to the top of the drill press base 10, and at precisely 45° in both directions from the parallel position. Although only three apertures 178 are shown in the illustrated embodiment, it is recognized that apertures 178 may also be provided for precise 15° and 30° angular positions of the tilt table assembly 56 relative to the drill press base 10.

Figure 10:
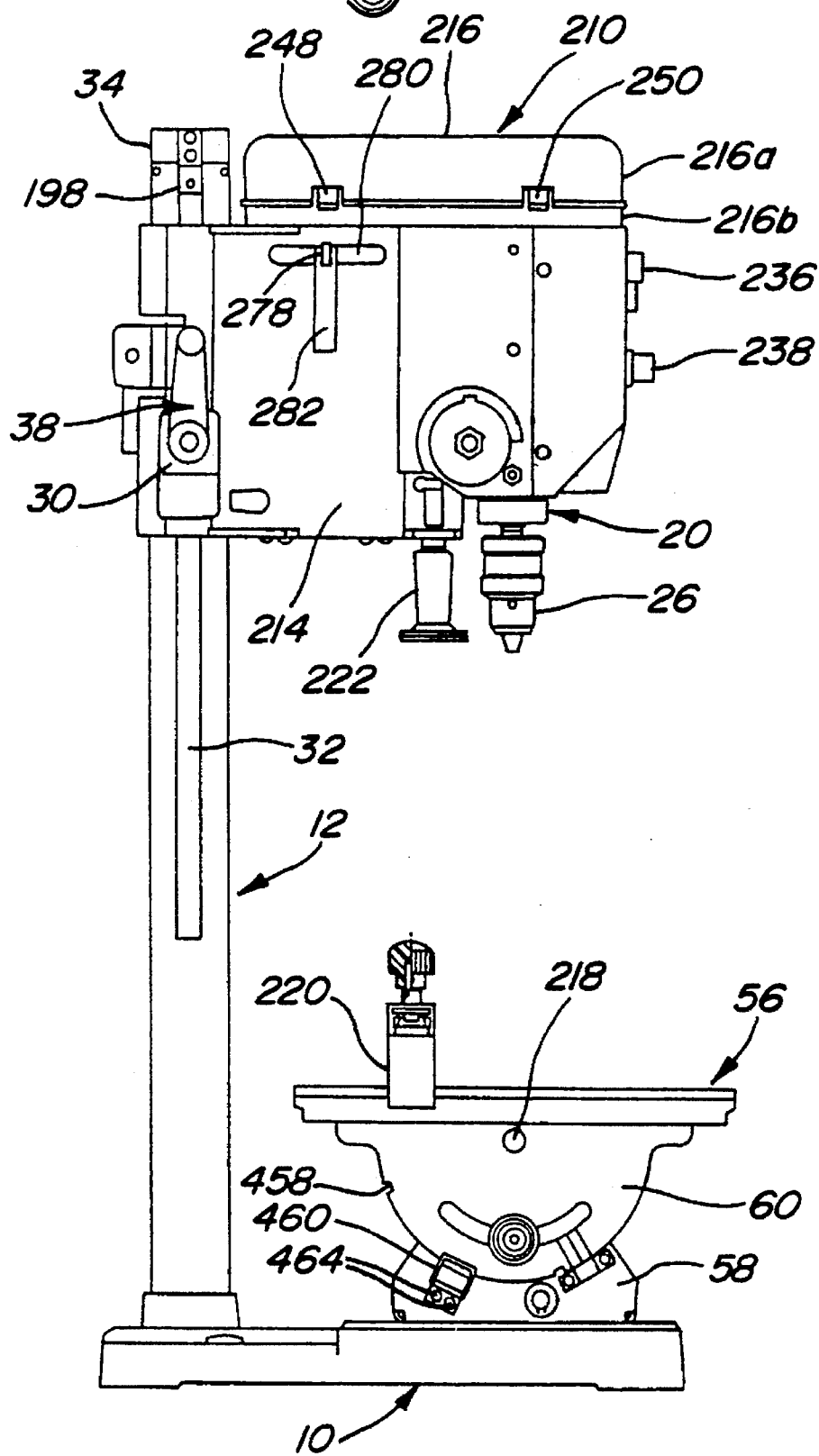
FIG. 10 is a left side view of an alternate embodiment of the drill press.

An alternate angle detent mechanism is shown in FIGS. 10, 21 and 23. In this alternate embodiment, the sector disk 122 of the end member 112 has at least three notches 458 provided at preselected locations which are engaged by an engagement member 460 shown in FIGS. 10 and 23. The engagement member 460 has a raised portion 460a for engaging the desired notch 458 provided in the sector disk 122, a lever portion 460b which is depressed by the operator to release the raised portion 460a from the notch permitting the operator to rotate the pivoting frame 60 relative to the supporting base 58, a U-shaped portion 396c received in an aperture 462 provided in the trunion 64 of the supporting base 58, and a mounting lip 460d which abuts the surface of the trunion 64. The mounting lip 460d is secured to the trunion 64 by a pair of rivets 464. Preferably, the center notch of the three notches 468 is located so that when it is engaged by the engagement member 460, the top of the pivoting frame 60 is parallel to the drill press base 10. The other two notches 458 are located such that the engagement member 460 will lock the pivoting frame 60 so that it is disposed at an angle of 45° relative to the drill press base in either direction. As is known in the art, additional notches 458 may be provided to lock the pivoting frame 60 to the supporting base 58 at other selected angles to the drill base 10, such as a 30° angle, a 60° angle or both.

The table plate 116 may be a solid board, a plywood board, a particle board or a plastic board as is known in the art. Preferably, the thickness of the table plate 116 is selected to be of a standard thickness ranging from 19 mm (¾ inch) to 25.4 mm (1.0 inch). As previously discussed, the height of the vertical portions of the side and end members of the pivoting frame 60 are selected so that the top surfaces of the side and end member are flush with the top surface of the table plate 116 and vice versa.

Returning to FIG. 1, the drill press assembly may also include a work clamp 182 attachable to the frame 16 of the drill head assembly 14. The work clamp 182 has a housing 184 which is fixedly attached to the frame 16 and which slidably guides a work clamp bar 186 in a generally vertical direction normal to the drill press base 10. Locking leaf spring cam plates 188 secure the work clamp bar 186 to the housing 184. The operation of the locking leaf spring cam plates 188 is well known in the art and therefore need not be explained in detail for an understanding of the work clamp 182.

A radial arm 190 has one end attached to the work clamp bar 186 and is rotatable therewith about the vertical axis of the work clamp bar 186. A pressure foot 192 is swivably attached to one end of a threaded shaft 194 threadably received through a threaded bore provided in the distal end of the radial arm 190. A handle 196 is attached to the opposite end of the threaded shaft 194 which permits the rotation of the threaded shaft 194 to displace the pressure foot 192 into a holding engagement with a workpiece mounted on the tilt table assembly 56.

Figure 12:
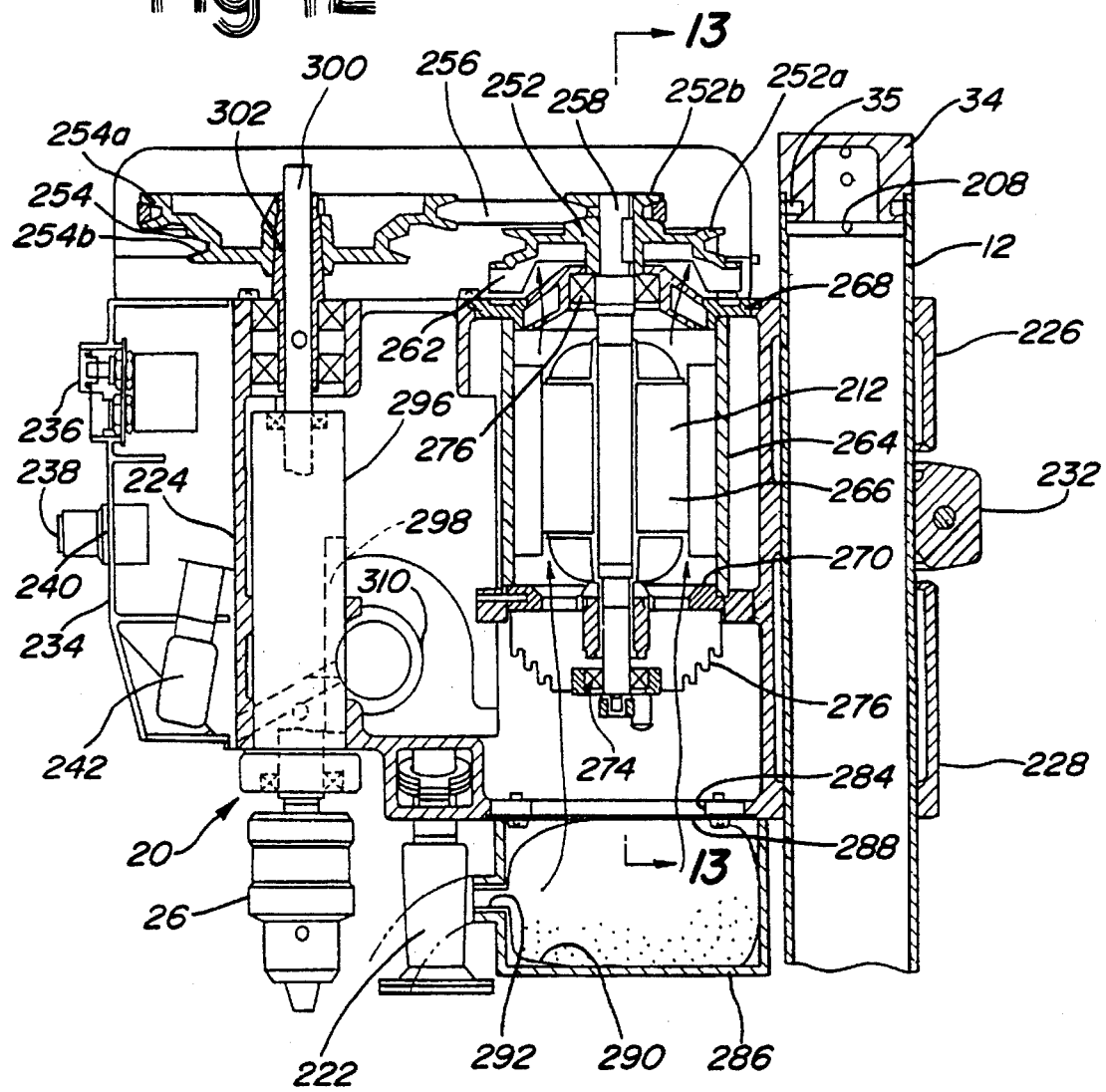
FIG. 12 is a partial side cross-sectional view of the drill head assembly.
Figure 13:
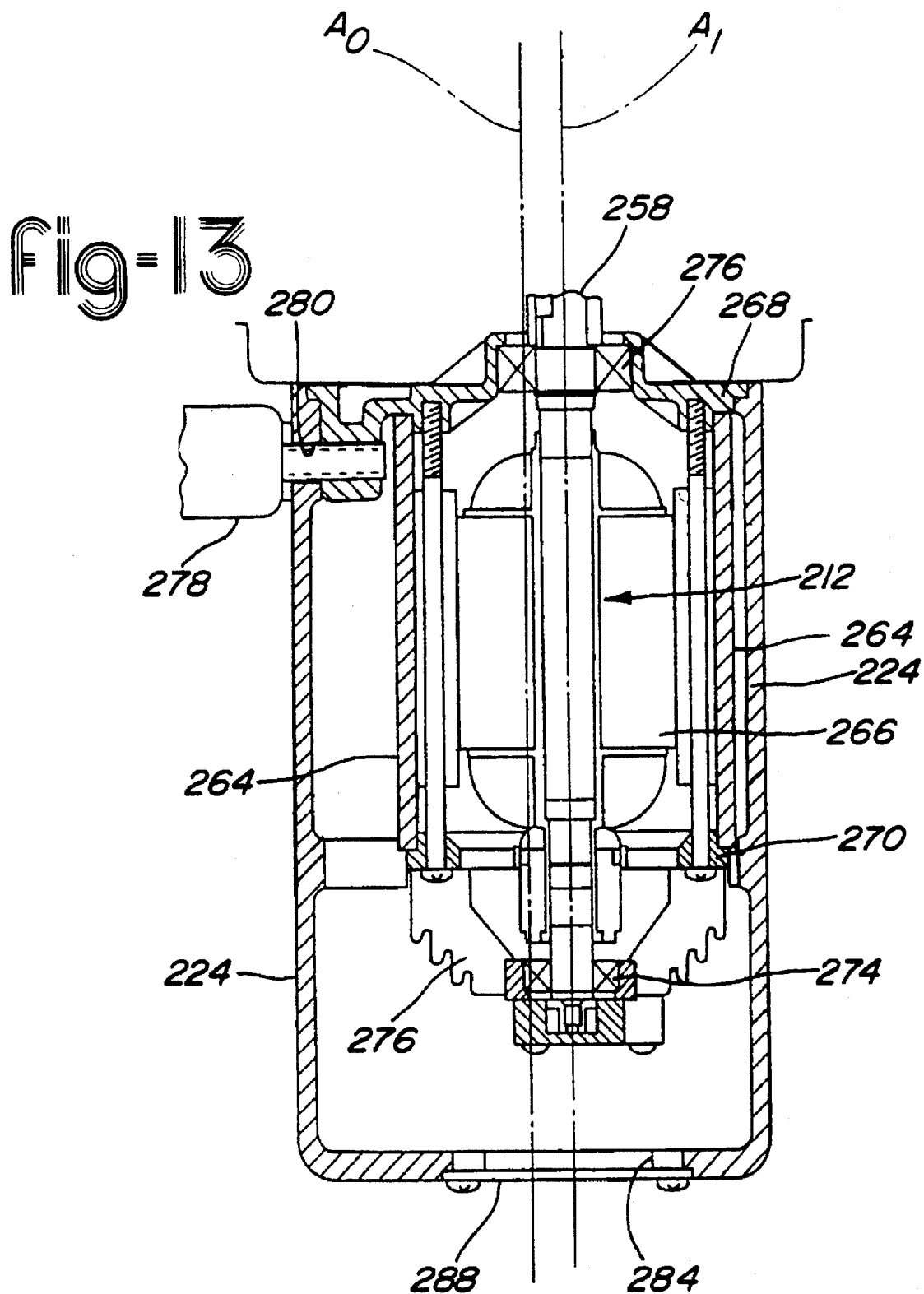
FIG. 13 is a partial front cross-sectional view of the drill head assembly.

FIGS. 10 and 11 show an alternate embodiment 210 of the drill head assembly 14. In this embodiment, the electric motor 212 as shown in FIG. 12, is enclosed in a drill head housing 214 on the same side of the column 12 as the quill 20. This eliminates the need for a hole in the cover 216 for passage of the column 12 providing superior protection for the drive mechanism between the electric motor 212 and the quill 20. This embodiment also eliminates the requirement of raising the drill head assembly 210 to the top of the column 12 to open the cover 216. Thus, the cover 216 may be opened at any axial location of the head assembly 198 along the column 12 to change the speed ratio between the quill 20 and the output of the electric motor 212. Preferably, the electric motor 212 is a permanent magnet motor.

As in the embodiment described relative to FIGS. 1–9, the drill head assembly 210 is pivotably mounted on the column 12 and is vertically displaceably by a rack and pinion mechanism 30 consisting of a rack 32 and a pinion 30. A crank 38 is provided to rotate the pinion 30 which is engaged with the rack 32 and vertically displaces the drill head assembly 210 relative to the base 10. The rack 32 is attached to the cap 34 in the same manner as described relative to the first embodiment and is rotatable about the column 12. An indexing mechanism 198 is shown in FIG. 9 may be attached to the cap 34 at the top of the column 12.

A tilt table 56 is mountable on the base 10 as previously described relative to FIGS. 1–9. The tilt table 56 has a supporting base 58 and a tilting frame 60, pivotable relative to the supporting base about a pivot axis 218. A fence 220 is attachable to the tilting frame 56 and is displaceable thereon in a transverse direction. The drill head assembly 210 also includes a work clamp 222 which is extendable in a downward direction to hold a workpiece on the tilt table 56 as shall be discussed hereinafter.

The details of the drill head assembly 210 are shown in FIG. 12. The drill head housing 214 has a frame 224 which encloses the lower part of the drill head assembly 210. The frame 224 has a pair of vertical guide members 226 and 228 circumscribing the column 12 on opposite sides of clamping flanges 230 and 232. The clamping flanges 230 and 232 are the functional equivalent of clamping flanges 40 and 42 shown in FIG. 3. A clamping knob such as knob 45 or a clamping lever 233 is used to clamp the frame 224 to the column 12. The frame 224 has a control box 234 mounted on its front face. The control box 234 houses the ON/OFF switch 236, a speed control knob 238 for adjusting the rotational speed of the electric motor 212, a work light switch 240 and a work light 242.

The cover 216 comprises an upper cover 216a and a lower cover 216b which is attached to the top of the frame 224. The upper and lower covers 216a and 216b are hinged to each other by a pair of hinges 244 and 246 along one edge as shown in FIG. 11 and are locked to each other by a pair of elastic engaging members 248 and 250 connected to the upper cover 216a. The elastic engaging members 248 and 250 have lower projections which engage in openings provided in the lower cover 216b. The head cover 216 encloses two combined pulleys 252 and 254 connected by a belt 256.

Combined pulley 252 has at least a large pulley 252a and a small pulley 252b. In a like manner, pulley 254 has at least a large pulley 254a transversely aligned with small pulley 252b and a small pulley 254b transversely aligned with large pulley 252a. The belt 256 connects, in the alternative, the large pulley 252a with the small pulley 254b or the large pulley 254a with the small pulley 252b. As is known in the art, combined pulleys 252 and 254 may each have more than two pulleys.

The pulley 252 is attached to the output shaft 258 of the electric motor 212 and the pulley 254 is attached to a shaft 260 of the quill 20. Fan blades 262 are provided on the lower surface of the pulley 252 which acts as a centrifugal fan when the pulley 252 is rotated. The centrifugal fan produces an air flow through the motor housing 264 cooling the motor. The motor 212 is disposed in the frame 224 between the column 12 and the quill 20 resulting in a compact drill head assembly. The rotor 266 of the motor 212 is directly attached to the output shaft 258 and is enclosed within the motor housing 264. The motor housing 264 includes an upper support plate 268 and a lower support plate 270. The upper and lower support plates 268 and 270 have vent apertures as shown permitting the air flow generated by the fan blades 262 to flow through the motor housing 264. A bearing 272 rotatably connects the shaft 258 to the upper support plate 268 and a bearing 274 supports the lower end of the shaft 258 to a brush end cap 276.

The upper support plate 268 is rotatably mounted in an aperture provided in the frame 224 and is rotatable about an axis $A_0$. The axis of rotation $A_1$ of the shaft 258 of the motor 212 is offset from the axis of rotation $A_0$ of the upper support plate 268 a predetermined distance. A lever shaft 278 is threadably attached to the upper support plate 268 through a slot 280 and extends external to the frame 224 as shown in FIG. 1. A lever 282 is pivotably attached to the end of the lever shaft 278 to facilitate the rotation of the upper support plate 268 relative to the frame 224. Rotation of the upper support plate 268 by the lever 282 in a first direction displaces the electric motor 212 toward the quill 20 loosening the belt 256. This permits the belt 256 to be moved from pulleys 254a and 252b to pulleys 254b and 252a and vice-versa. Moving the lever 282 in the reverse direction displaces the pulley 252 away from the quill 20 tightening the belt 256. Because of the eccentric rotation of the motor 212 and its shaft 258, relative to the quill 20, the tension on the belt 256 can be precisely adjusted after changing the position of the belt or replacement of a worn belt with a new one.

An opening 284 is provided in the frame 224 below the motor 212 connecting the interior of the frame 224 to a chip box 286. A dust filter 288 covers the opening 284 and prevents dust and drilling chips from being sucked into the motor housing 264 with the cooling air flow generated by the fan blades 262 attached to pulley 262. A chip bag 290 is disposed in the chip box 286 and stores the dust and chips sucked into the chip box 286 through an air intake aperture 292. The air flows through opening 284, through the motor housing 264, and is discharged from the drill head assembly via a vent hose 294 attached to the lower cover 216b as shown in FIG. 11.

The quill 20 comprises a cylindrical sleeve 296 having a rack 298 on its outer surface, a spline shaft 300 which is engaged by the internal spline of a tapered sleeve 302, and the chuck 26 attached to the lower end of the spline shaft 300. The lower portion of the tapered sleeve 302 is supported by bearings 304 and 306. The rack 298 is engaged by teeth provided in a quill driving shaft 308 which is connected to the three arm handle 24. The quill driving shaft 308 is resiliently biased by a coil spring 310 having one end attached to the frame 224 and the other end attached to the quill driving shaft 308. The coil spring 310 biases the quill driving shaft to rotate in a direction displacing the chuck 26 away from the drill press base 10. Therefore, when the three arm handle 24 is rotated against the force of the coil spring 310, the cylindrical sleeve 296, together with the chuck 26, are moved downwardly toward the drill press base 10 and is moved upwardly away from the base when the three arm handle 24 is released.

Figure 14:
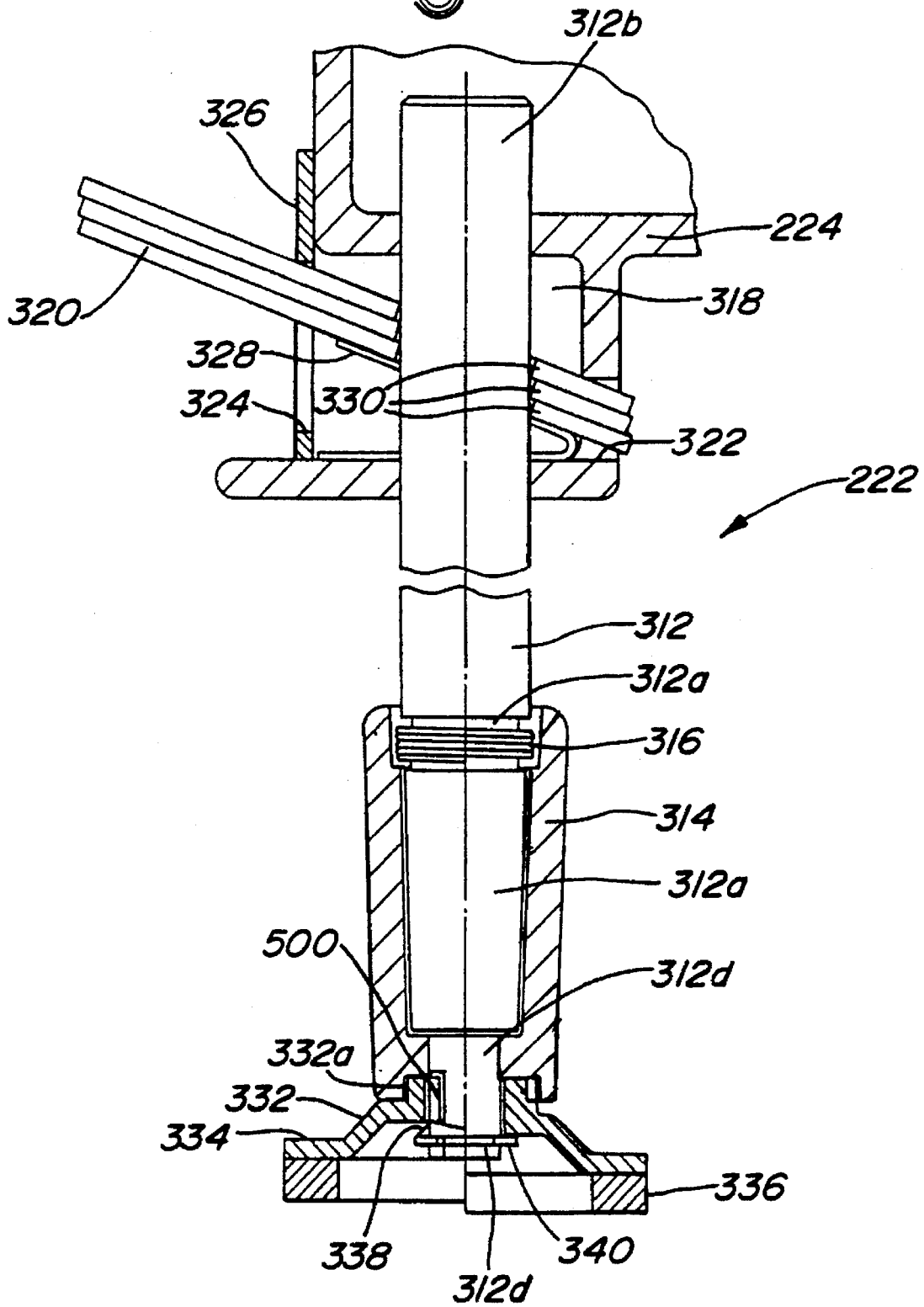
FIG. 14 is a partial side cross-sectional view of a second embodiment of the clamping device.

The details of the clamping device 222 are shown in FIG. 14. The clamping device 222 has a shaft 312 which has a tapered portion 312a and an upper portion 312b. The tapered portion 312a is rotatably connected to a sleeve 314. The upper portion of the sleeve 314 accommodates a coil spring 316 for returning the sleeve 314 to an initial position from a rotated position. One end of the coil spring 316 is fixed to the sleeve 314 while the other end is fixed to a small diameter portion 312c of the shaft 312. The upper portion 312b of the shaft 312 passes through a partially enclosed chamber 318 provided in the lower face of the frame 224. The chamber 318 has an open end and a closed end. A plurality of locking plates 320 are obliquely disposed in the chamber 318. One end of the locking plates 320 are received in a slot 322 provided at a lower edge of the closed end of the chamber 318 while the other end of the locking plates 320 extend out of a rectangular aperture 324 provided in a closure plate 326 covering the open end of the chamber 318. The locking plates 320 are biased toward the upper edge of rectangular aperture 324 by a V-shaped spring 328. As is known in the art, the locking plates 320 have apertures 330 through which the shaft 312 passes. When the locking plates are biased upwardly by the V-shaped spring 328, the shaft 312 is engaged by the edges of the apertures 330 locking the shaft 312 to the frame 224. Manually depressing the external ends of the locking plates 320 disengages the shaft 312 from the locking plates, permitting the shaft 312 to be moved vertically relative to the frame 224.

A work clamping member 332 is attached to the lower end of the shaft 312. The work clamping member 332 is in the shape of a cup having an annular flange 334. A rubber ring 336 is attached to the lower surface of the annular flange 334 as shown. A cylindrical boss portion 332a of the working clamp 332 receives there-through a small diameter portion 312d of the shaft 312. A wave spring 338 is disposed between the inside surface of the cup-shaped portion of the work clamping member 332 and a stop ring 340 attached adjacent to the lower end of the small diameter portion 312d. The wave spring 338 urges the work clamping member 332 in an upward direction.

Figure 15:
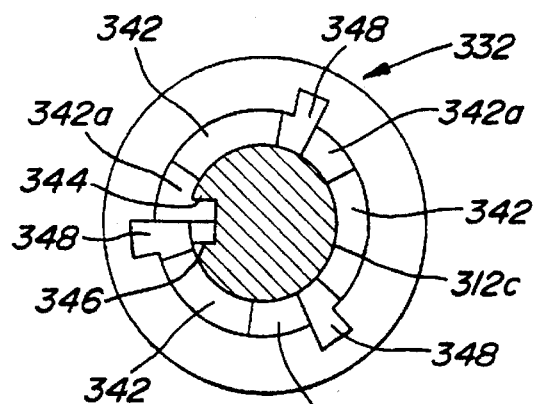
FIG. 15 is a cross-sectional view of the sleeve showing the details of the detents and cam surfaces.
Figure 16:
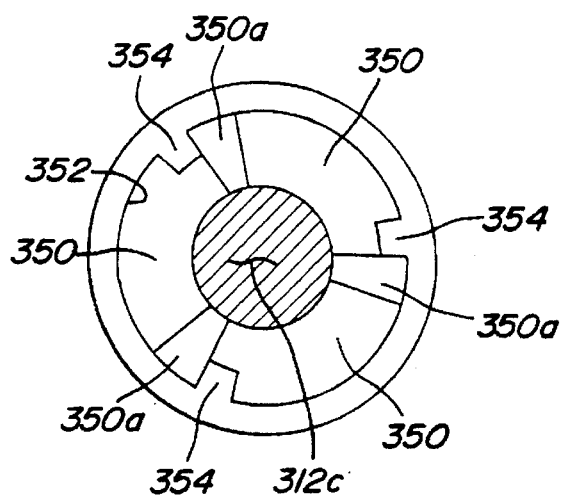
FIG. 16 is a cross-sectional view of the work clamping member showing the details of the detents and cam surfaces.

The upper face of the cylindrical boss portion 332a has three arcuate cam surfaces 342 as shown in FIG. 15. The arcuate cam surfaces 342 have the same contour. The small diameter portion 312d of the shaft 312 has a key slot 344 which receives a key 500 provided on the internal surface of the cylindrical boss portion 332a connecting the work clamping member 332 to the small diameter portion 312d of the shaft. Radial projections 348 are formed between the adjacent cam surfaces 342.

The sleeve 314 also has three cam surfaces 350 provided at its lower end which mate with the three cam surfaces 342 provided on the upper surface of work clamping members cylindrical boss 332a. The lower end of the sleeve 314 has a cylindrical rim 352 circumscribing the cylindrical boss 332a of the work clamping member 332. The cylindrical rim 352 has three projections 354 extending radially inwardly which are engageable with the projections 348 provided on the work clamping member 332. The projections 352 limit the rotation of the work clamping member 332 relative to the sleeve 314.

When a drilling operation is to be performed, the workpiece is placed on the tilt table 56 and the drilling head 210 is lowered to the desired height above the workpiece. The lock plates 320 are then depressed against the force of V-spring 328 freeing the shaft 312. The shaft 312 and the work clamping member 332 are then lowered until they engage the workpiece. The lock plates 320 are then released, again locking the shaft 312 to the drill head assembly 210. The sleeve 314 is then rotated against the force of the coil spring 316, causing the mating cam surfaces 342 and 350 to press the clamping member 332 against the workpiece, locking it on the tilt table 56 in the desired position. The cam surfaces 348 on the clamping member 322 have flat surfaces 348a and the cam surfaces 350 on the sleeve 314 have corresponding flat surfaces 350a, which frictionally lock the clamping member 322 to the sleeve 314 when the sleeve 314 is fully rotated to the position in which the clamping member 322 is fully pressed against the workpiece by the cams 348 and 350.

Figure 18:
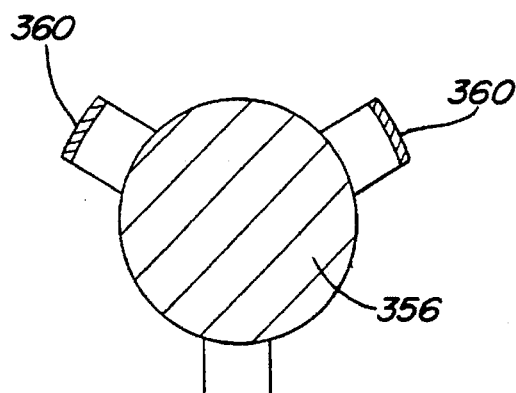
FIG. 18 is a top cross-sectional view showing the arrangement of the spider spring.
Figure 19:
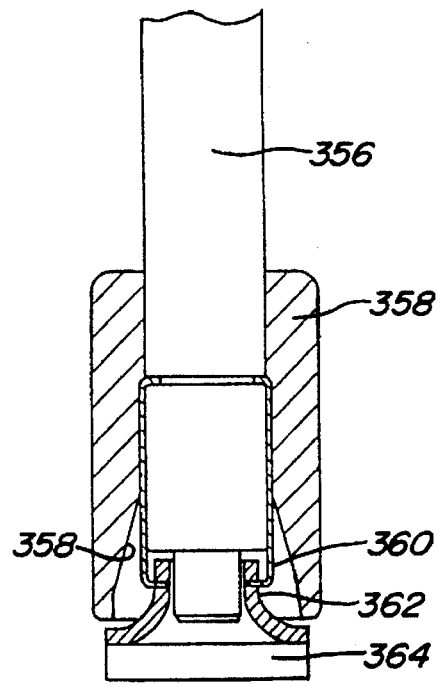
FIG. 19 is a cross-sectional view of the third embodiment of the clamping device in the clamped state.

An alternate embodiment of the clamping device 222 is shown in FIGS. 17–19. The alternate embodiment has a shaft 356 which is attached to the frame 224 by a set of clamping plates 320 biased to an oblique angle by a V-shaped spring 28 as discussed relative to the embodiment shown in FIG. 14. Disposed at a lower portion of the shaft 356 is a slide sleeve 358 which has an internal cylindrical portion 358b and a conical portion 358a. This conical portion 358a of the slide sleeve 358 engages the members of a spider spring arrangement 360. As shown in FIG. 18, the spider spring arrangement 360 comprises three equally spaced arcuate springs 360a, 360b and 360c, which are bowed outwardly. The upper end of the springs 360a, 360b and 360c are held in an annular groove 356a formed in the shaft 356 in the region covered by the slide sleeve 358. The lower end of the springs 360a, 360b and 360c engage an annular groove 362a provided in a work clamp member 362. A rubber ring 364 is attached to the work clamp member 362 on the face facing the base 10. The work clamp member 362 has a central aperture 362a which circumscribes a reduced diameter portion 356b of the shaft 356.

As shown in FIG. 19, the work clamp member 362 is pressed against a workpiece disposed on the tilt table 56 by lowering the slide sleeve 358 towards the workpiece which causes the three arcuate springs 360a, 360b and 360c to be straightened by the cylindrical portion 358b vertically displacing the work clamp member toward the workpiece a predetermined distance.

The details of the fence 220 are shown in FIGS. 22, 24 and 25. The fence 220 has a main body 402 in the shape of a hollow rectangular bar having a cross-section as shown in FIG. 24, a left fixing block 404 and a right fixing block 406. The left fixing block 404 comprises a base 404a received in the main body 402 and attached thereto by a plurality of fasteners corresponding to bolts 408 holding the right fixing block 406 to the main frame 402 as shown in FIG. 25 and an abutting portion 404b formed integral with the base 402a. The abutting portion 404b abuts the left end of the main body 402 and extends in a downward direction. The abutting portion 404b has a lip 402c inclined inwardly which engages the distal end of the upper flange portion 138 of the end member 112.

The right fixing block 406, as more clearly shown in FIG. 25, has a base 406a received into the main body 402 and secured therein by bolts 408, and a cam support portion 406b formed integral with the base 406a. The cam support portion 406b abuts the right end of the main body 202 and extends downwardly. The cam support portion 406b, as shown in FIGS. 24–27, has side plates 410 and 412 which rotatably support an eccentric pin 414. An eccentric cam 416 has a bore 418 which receives the eccentric cam 414. The bore 418 is offset from the axis of the eccentric pin 416. The eccentric cam 416 also has a threaded bore 420 provided perpendicular to the bore 418 which threadably receives a threaded shaft 422 extending from the end of a grip 424.

The eccentric pin 414 and eccentric cam 416 are arranged so that the eccentric cam abuts against the distal end of the upper flange portion 138 of the end member 114. When the grip 424 is moved downwardly from a horizontal position to a vertical position, the surface of the eccentric cam 416 engages the end of the flange portion 138 of the end member 114 and produces a force urging the bottom of the main body 402 against the top surface of the tilting frame 60 locking the fence 402 thereto.

The threaded shaft 422 locks the eccentric pin 414 to the eccentric cam 416 so that they rotate together. When the threaded shaft 422 is disengaged from the eccentric pin 414, the eccentric pin may be independently rotated to adjust the force generated by the grip 424 when it is rotated to a vertical position.

A slide plate 426 is slidably received in the main body 402 between longitudinal guides 428 as shown in FIGS. 24 and 28 and is internally supported by an internal transverse rib 432 extending between the opposite sidewalls of the fence 402. The slide plate 426 is frictionally locked to the transverse rib 432 by a locking device 434. The locking device 434, as shown more clearly in FIG. 28, has a knob 436, a bolt 438 attached to the knob 436 and a bolt receiving block 440 slidably received in the groove between longitudinal ribs 430 and 442 shown in FIG. 24. The bolt receiving block 440 has a threaded bore which threadably receives bolt 438 therethrough. A spring member 444 is connected to the end of bolt 438 and engages the upper surface of the slide plate 426.

Returning to FIG. 22, an indicator 446 is movably provided in a guide space of the main body 402 for indicating a position of the slide plate 426. Indicating marks, such as ruler markings (not shown), are formed on the upper surface of the slide plate 426 and are observable through the indicator.

A stop block 448 is provided at one end of the slide plate 426. The stop block 448 has two opposed support plate 450 and 452 between which two stopping plates 454 are pivotably supported by pins 456.

When a drilling operation is being performed, an end face of the piece to be drilled is pushed against the side face of the stopping plate 454 along a side face of the main body 402 of the fence to locate the piece on the top surface of the tilt table 56. When the stopping plates 454 are not used, they are pivoted upward about pins 456 and no longer obstruct the side surface of the main body 402. When drilling a plurality of pieces having the same shape, the slide plate is locked in place by the locking device 434 and the piece to be drilled is placed in abutment with fence 220 and the stopping plate 454 to precisely locate the piece relative to the drill machine head 14.

As shown in FIG. 31, if the fence 220 is tightly fastened to the table 60, and the table 60 is then inclined, even a round bar 600 can be stably located on the table 60.

The location of the fence 202 and the slide plate 426 may be adjusted to accommodate different sizes of pieces to be drilled or to drill the same piece in a different location. The location of the slide plate 426 may be moved by loosening the locking knob 436, then displacing the slide plate 426 a desired distance by observing the measuring marks on the slide plate through the indicator 446. The displacement of the slide plate 426 displaces the location of the stopping plates 454 attached thereto.

Having disclosed a specific embodiment of the drill press assembly having a tilt table assembly, it is recognized that others skilled in the art may make certain changes or improvements within the scope of the invention as set forth in the appended claims.

What is claimed is:

1. A drill press for drilling a workpiece, said drill press comprising:

a base;

a column standing upright on said base;

a drill head including a quill for rotating a tool, and a driving motor for rotating said quill;

a table mounted on said base for mounting said workpiece thereon, said quill movable in a vertical direction toward said base, said table having a pivoting frame with a table plate therein, said table being movable in two directions perpendicular to each other with respect to said base.

2. The drill press according to claim 1 wherein said table has a supporting base having two trunion plates spatially separated from each other for holding said pivoting frame, said supporting base having, at its bottom, a slit extended in a longitudinal direction, said base having a slit extended in a transverse direction perpendicular to said longitudinal direction of the slit of said supporting base, a locking bolt passing through said longitudinal and transverse slits to enable said table to rotate about said locking bolt and to move in two directions perpendicular to each other with respect to said base.

3. The drill press according to claim 1 wherein said table has a fence for positioning a workpiece thereon, said fence having, at its opposed ends, two fixing blocks for fixing the fence onto said table, each fixing block abutting against an end piece of a table frame.

4. The drill press according to claim 3 wherein one of said two fixing blocks has an eccentric cam mechanism, said eccentric cam mechanism having an eccentric cam rotatable to cause a cam surface of said eccentric cam to abut against said end piece of said pivoting frame.

5. The drill press according to claim 4 wherein said eccentric cam mechanism comprises an eccentric pin eccentrically held in said one of said two fixing blocks, said eccentric cam accommodating said eccentric pin therein, and a grip having one end screw-engaged with said eccentric cam, said eccentric pin and said eccentric cam being rotated together when an end face of said one end of said grip abuts against said eccentric pin.

6. The drill press according to claim 4 wherein said end piece of said pivoting frame has an inclined distal end engaged by said cam surface of said eccentric cam.

7. The drill press according to claim 3 wherein said fence has a stopper projecting laterally of said fence for stopping a workpiece at a predetermined position, said stopper being attached to a slide plate slidably disposed in said fence.

8. The drill press of claim 1 wherein said base has a transverse slot which has an opening at one edge of said base and wherein a shaft of a cam activated locking member for locking said table onto said base and a lock member provided at an end of said shaft are received into said transverse slot through said opening.

9. The drill press of claim 8 wherein said cam activated locking mechanism is an eyebolt having a threaded shaft and said lock member is a nut threaded onto one end of said threaded shaft.

10. The drill press of claim 8 wherein said cam activated locking member comprises:

an L-shaped bracket having a horizontal portion and a vertical portion, said vertical portion terminating adjacent to a base portion of a supporting base for supporting said table;

a bolt having a head and a threaded shaft, said threaded shaft passing through a longitudinal slot provided at said base portion, an aperture being provided through said horizontal portion of said L-shaped bracket, said head of said bolt being said lock member; and a nut threadably received on the end of said threaded shaft passed through said aperture on said horizontal portion of said L-shaped bracket; and wherein a camshaft is provided for producing a first force vertically displacing said cam activated lock member, said camshaft engaging a distal end of said horizontal portion of said L-shaped bracket opposite said vertical portion, said camshaft having a lock position lifting said horizontal portion and said bolt a distance sufficient to cause said head of said bolt to forcefully engage a surface of said base.

11. The drill press of claim 1 wherein said table has a pivoting frame pivotably attached to a supporting base of said table, said pivoting frame comprises:

a pair of spatially separated C-shaped longitudinal side members, said longitudinal side members having a horizontal top portion, a horizontal bottom portion substantially parallel to said top portion and a vertical side portion connecting said top portion to said bottom portion, the width of said bottom portion being greater than the width of said top portion and serves as a seat for said table plate along the length of said longitudinal side members;

a pair of end members connected to the respective ends of said longitudinal members to form a rectangular frame, each of said end members having a horizontal portion attached to said horizontal bottom portion of said longitudinal side members and forming a seat for said table plate along the length of said end member, said horizontal portion having an inner edge facing the inside of said rectangular frame and an outer edge, each of said pair of end members further comprising a sector disk portion extending downwardly from said inner edge of said horizontal portion and a vertical portion extending upwardly from said outer edge of said horizontal portion, said vertical portion forming an end retainer for said table plate; and means for pivotably connecting each of said sector disks to a respective one of two trunions extending vertically from opposite ends of said supporting base.

12. The drill press of claim 11 further comprising means for frictionally locking said sector disks to said trunions to lock said pivoting frame to said supporting base.

13. The drill press of claim 11 wherein a detent mechanism having a spring-loaded member is mounted on one of said sector disks, and wherein said associated trunion has at least three apertures for receiving said spring-loaded member to precisely set the angular relationship between said pivoting frame and said base portion for at least three different angles.

14. The drill press of claim 11 wherein at least one of said sector disks has a plurality of notches provided along its periphery and said trunion has an engagement member engageable one at a time in each of said plurality of notches, said plurality of notches setting said tilt frame at predetermined angles relative to said base portion when said notches are engaged with said engagement member.

15. The drill press of claim 1 wherein said drill head further comprises a head box which supports said driving motor and said quill, said driving motor and said quill being attached to said head box on opposite sides of said column.

16. The drill press of claim 1 wherein said drill head further comprises a head box which supports said driving motor and said quill, said driving motor is mounted to said head box at a location intermediate said quill and said column.

17. The drill press of claim 1 further including a work clamp attached to said drill head, said work clamp manually displaceable to clamp a workpiece to said table.

18. A drill press for drilling a work, which comprises:
 a base, a column standing upright on said base, and a drill head including a quill for rotating a tool and a driving motor rotating said quill, said drill head being rotatable by a head rotating mechanism around said column and moved vertically along the column by a head vertically movable mechanism, said head rotating mechanism comprising a sliding portion provided on one side of said drill head engageable with said column, fastening means for fastening said sliding portion to said column and loosening it from said column, a rotatable cap supported rotatably by said column, a rack having one end attached to said rotatable cap and a free end, and a gear mechanism provided in said sliding portion engageable with said rack.

19. The drill press according to claim 18 wherein said rotatable cap is provided rotatably on a top surface of said column, the rotation of said rotatable cap being guided by guide means provided between a peripheral wall of a top surface of said column and a circumferential wall of said cap.

20. The drill press according to claim 18 wherein said rotatable cap has head locating means for locating said drill head at a predetermined angular position.

21. The drill press according to claim 18 wherein said drill head has a head box which supports said driving motor and said quill, said driving motor and said quill being supported in said head box on opposite sides of said column.

22. The drill press according to claim 18 wherein said driving motor is provided in said drill head between said quill and said column.

23. The drill press according to claim 18 wherein said drill head has motor support means for supporting said drive motor, said motor support means having an axis of rotation offset from an axis of said drive motor and means for rotating said motor support means from outside of said drill head.

24. The drill press according to claim 18 wherein a chuck is attached to one end of said quill and said drill press further has a work clamp device provided close to said chuck in order to hold a workpiece at a predetermined position.

25. The drill press according to claim 24 wherein said work clamp device comprises a shaft, locking means for locking said shaft on said drill head and for releasing it therefrom, a rotatable member supported rotatably on said shaft, and a work clamp member, supported movably along said shaft, said work clamp member contacting a workpiece to fixedly hold said workpiece relative to said chuck, said work clamp member moved vertically by rotating said rotatable member.

26. The drill press according to claim 25 wherein said rotatable member has a cam surface engaging a cam surface provided on said work clamp member, said cam surface of said rotatable member being opposed to said cam surface provided on said work clamp member.

27. The drill press according to claim 24 wherein said work clamp device comprises a shaft, locking means for locking and releasing said shaft on said drill head, a slide member movable along said shaft, a work clamp member supported movably along said shaft, and a connecting member connecting said work clamp member to said shaft, said connecting member being elongated and shrunk by moving said slide member along said shaft to move said work clamp member along said shaft.

28. The drill press according to claim 18 wherein said drive motor has a driving shaft onto which a pulley is fixed, said pulley having a fan integral therewith for producing an air flow cooling said driving motor.

29. The drill press according to claim 18 wherein said drill head has a head box for accommodating said driving motor and said quill, a head cover provided on said head box covering at least one pulley fixed on a driving shaft of said driving motor and at least one pulley fixed on said quill, a belt entrained between said pulleys fixed on said driving shaft and said quill, means being provided through said head cover for discharging an air flow produced by a fan provided integrally with said at least one pulley fixed on said drive shaft.

30. The drill press according to claim 18 wherein said drill head has a head box for accommodating said driving motor and said quill, said head box having a chip box, a suction hose attached to said chip box for sucking a cooling air, chips and dust, said chip box having a chip bag therein for storing said chips and dust, and a filter provided at an opening between said chip box and said driving motor.

31. A drill press for drilling a workpiece, comprising:
 a base;
 a column standing upright on said base;
 a drill head having a quill, said quill having means for holding a tool;
 a driving motor for rotating said quill;
 a head rotating mechanism facilitating the rotation of said drill head around said column;
 a head vertically moving mechanism for moving said drill head vertically along said column; and
 a tilt table mounted on said base, said table being movable in two directions perpendicular to each other with respect to said base.

32. The drill press according to claim 31 wherein said head rotating mechanism comprises:
 a sliding portion provided on one side of said drill head engaging said column;
 fastening means for fastening said sliding portion onto said column and for loosening it therefrom;
 a cap rotatably supported by said column; and
 a rack having one end fixed to said cap and a free end.

33. The drill press according to claim 32 wherein said cap is provided rotatably on a top surface of said column, the rotation of said cap being guided by a guide means provided between a peripheral wall of said top surface of said column and a circumferential wall of said cap.

34. The drill press according to claim 32 wherein said cap has head locating means for locating said drill head at a predetermined angular position relative to said base.

35. The drill press according to claim 31 wherein said drill head comprises a head box supporting said driving motor and said quill, said driving motor and said quill being supported in said head box on opposite sides of said column.

36. The drill press according to claim 31 wherein said drill press has a head box enclosing said driving motor and said quill, said driving motor being provided in said head box between said quill and said column.

37. The drill press according to claim 31 wherein said head box has motor support means for supporting said driving motor, said motor support means having an axis of rotation and rotatable from outside of said head box, said driving motor being supported eccentric to said axis of rotation.

38. The drill press according to claim 31 further comprising a work clamp device provided close to a chuck attached to said quill to clamp a workpiece on said tilt table at a predetermined position.

39. The drill press according to claim 38 wherein said work clamp device comprises:
   a shaft;
   locking means for locking said shaft on said drill head and for releasing it therefrom;
   a rotatable member supported rotatably on said shaft; and
   a work clamp member, supported movably along said shaft, said work clamp member movable toward said workpiece, said work clamp member movable toward said tilt table by rotating said rotatable member in a first direction and moved away from said tilt table by rotating said rotatable member in a reverse direction.

40. The drill press according to claim 39 wherein said rotatable member has a cam surface engaging a cam surface provided on said work clamp member, said cam surface of said rotatable member being opposed to said cam surface provided on said work clamp member.

41. The drill press according to claim 38 wherein said work clamp device comprises:
   a shaft;
   locking means for locking said shaft on said drill head and releasing it therefrom;
   a slide member movable axially along said shaft;
   a work clamp member supported movably along said shaft; and
   a connecting member connecting said work clamp member with said shaft, said connecting member being elongated by moving said slide member along said shaft toward said tilt table, the elongation of said connecting member moving said work clamp member toward said tilt table.

42. The drill press according to claim 31 wherein said drive motor has a driving shaft onto which a pulley is fixed, said pulley having a fan integrally therewith producing an air flow cooling said driving motor and collecting dust and chip.

43. The drill press according to claim 31 wherein said drill head has a head box for accommodating said driving motor and said quill, a head cover provided on said head box to cover therewith two pulleys, one of said two pulleys fixed on said driving motor and the other of said two pulleys fixed on said quill, a belt provided between said two pulleys, and means provided on said head cover to discharge an air flow produced by a fan provided integrally on said one of said two pulleys.

44. The drill press according to claim 31 wherein said drill head has a head box for accommodating said driving motor and said quill, said head box having a chip box to which a suction hose for sucking a cooling air, chips and dust is connected, said chip box having a chip bag therein to store said chips and dust, and a filter provided over an opening provided between said chip box and said driving motor.

45. The drill press according to claim 31 wherein said tilt table has a pivoting frame, said pivoting frame having a table plate provided therein.

46. The drill press according to claim 31 wherein the tilt table has a supporting base and a pivoting frame, said pivoting frame having two sector disks disposed separately from each other, said two sector disks supporting said pivoting frame on said supporting base, said supporting base having, at its bottom, a first slit extended in a first direction, said base having a second slit extended in a second direction perpendicular to said first direction of said slit of said supporting base, a locking bolt being passed through said first and second slits to enable said tilt table to rotate about said locking bolt and to move in two directions perpendicular to each other with respect to said base.

47. The drill press according to claim 31 wherein said tilt table has a fence to position a workpiece thereon, said fence having, at its opposed ends, two fixing blocks for fixing the fence onto said tilt table, each fixing block abutting against an end piece of said pivoting frame.

48. The drill press according to claim 47 wherein one of said two fixing blocks has an eccentric cam mechanism, said eccentric cam mechanism having an eccentric cam having a cam surface and means for rotating said eccentric cam to cause said cam surface of said eccentric cam to abut against said end piece of said pivoting frame.

49. The drill press according to claim 48 wherein said eccentric cam mechanism comprises an eccentric pin eccentrically held in said one of said two fixing blocks, said eccentric cam having a bore accommodating said eccentric pin therein, and a grip having one end screw-engaged with said eccentric cam, said eccentric pin and said eccentric cam being rotated together when an end face of said one end of said grip abuts against said eccentric pin locking said eccentric pin to said eccentric cam.

50. The drill press according to claim 48 wherein each end piece of said pivoting frame has an inclined distal end engageable by said cam surface of said eccentric cam.

51. The drill press according to claim 47 wherein said fence has a stopper projected laterally of said fence to stop a workpiece at a predetermined position along said fence, said stopper being held by a slide plate slidably received in said fence.

52. The drill press of claim 31 wherein said base has a transverse slot which has an opening at one edge of said base and wherein a shaft of a cam activated locking member for locking said table onto said base and a lock member provided at an end of said shaft are received into said transverse slot through said opening.

53. The drill press of claim 52 wherein said cam activated locking mechanism is an eyebolt having a threaded shaft and said lock member is a nut thread onto one end of said threaded shaft.

54. The drill press of claim 52 wherein said cam activated locking member comprises:
   an L-shaped bracket having a horizontal portion and a vertical portion, said vertical portion terminating adjacent to a base portion of a supporting base for supporting said table;
   a bolt having a head and a threaded shaft, said threaded shaft passing through a longitudinal slot provided at said base portion, an aperture being provided through said horizontal portion of said L-shaped bracket, said head of said bolt being said lock member; and
   a nut threadably received on the end of said threaded shaft passed through said aperture on said horizontal portion of said L-shaped bracket; and wherein a camshaft is provided for producing a first force vertically displacing said cam activated lock member, said camshaft engaging a distal end of said horizontal portion of said L-shaped bracket opposite said vertical portion, said camshaft having a lock position lifting said horizontal portion and said bolt a distance sufficient to cause said head of said bolt to forcefully engage a surface of said base.

55. The drill press of claim 31 wherein said table has a pivoting frame pivotably attached to a supporting base of said table, said pivoting frame comprises:

a pair of spatially separated C-shaped longitudinal side members, said longitudinal side members having a horizontal top portion, a horizontal bottom portion substantially parallel to said top portion and a vertical side portion connecting said top portion to said bottom portion, the width of said bottom portion being greater than the width of said top portion and serves as a seat for said table plate along the length of said longitudinal side members;

a pair of end members connected to the respective ends of said longitudinal members to form a rectangular frame, each of said end members having a horizontal portion attached to said horizontal bottom portion of said longitudinal side members and forming a seat for said table plate along the length of said end member, said horizontal portion having an inner edge facing the inside of said rectangular frame and an outer edge, each of said pair of end members further comprising a sector disk portion extending downwardly from said inner edge of said horizontal portion and a vertical portion extending upwardly from said outer edge of said horizontal portion, said vertical portion forming an end retainer for said table plate; and means for pivotably connecting each of said sector disks to a respective one of two trunions extending vertically from opposite ends of said supporting base.

56. The drill press of claim 55 further comprising means for frictionally locking said sector disks to said trunions to lock said pivoting frame to said supporting base.

57. The drill press of claim 55 wherein a detent mechanism having a spring-loaded member is mounted on one of said sector disks, and wherein said associated trunion has at least three apertures for receiving said spring-loaded member to precisely set the angular relationship between said pivoting frame and said base portion for at least three different angles.

58. The drill press of claim 55 wherein at least one of said sector disks has a plurality of notches provided along its periphery and said trunion has an engagement member engageable one at a time in each of said plurality of notches, said plurality of notches setting said tilt frame at predetermined angles relative to said base portion when said notches are engaged with said engagement member.

59. The drill press of claim 31 further including a work clamp attached to said drill head, said work clamp manually displaceable to clamp a workpiece to said table.

60. A tilt table mountable to a drill press base comprising:

a supporting base mountable to said drill press base, said supporting base having a substantially horizontal base portion engageable with a top surface of said drill press base and a pair of spatially separated vertical trunions extending upwardly from the opposite ends of said base portion;

a pivoting frame having a generally rectangular shape, said pivoting frame having a pair of longitudinal side members and a pair of transverse end members connected to the respective ends of said longitudinal side members, each of said end members having a sector disk extending vertically downward adjacent to a respective one of said spatially separated trunions;

a table plate supported within said pivoting frame by said longitudinal side members and said transverse end members;

means for pivotably connecting said sector disks to said trunions; and means for locking said supporting base to said drill press base.

61. The tilt table of claim 60 wherein said means for locking said supporting base to said drill press base comprises:

a longitudinal slot provided through said base portion of said supporting base;

a transverse slot provided through said drill press base;

an eyebolt having an eye and a threaded shank receivable through said longitudinal and said transverse slots;

a nut threaded onto said threaded shank adjacent a bottom surface of said drill press base;

a camshaft eccentrically mounted to said spatially separated vertical trunions, said camshaft passing through said eye of said eyebolt and operative, upon rotation, to vertically displace said eyebolt, said vertical displacement of said eyebolt causing said nut to engage a bottom surface of said drill press base and to produce a force on said trunions frictionally locking said base portion to said top side of said drill press base; and means for rotating said camshaft.

62. The tilt table of claim 60 wherein said means for locking said supporting base to said drill press base comprises:

an L-shaped bracket having a horizontal portion and a vertical portion, said horizontal portion having a through aperture;

a longitudinal slot provided through said base portion;

a transverse slot provided through said drill press base;

a bolt having a head and a threaded shaft, said threaded shaft extending upward through said transverse slot, said longitudinal slot and said through aperture;

a nut threadably received on said threaded shaft above said horizontal portion of said L-shaped bracket;

a camshaft mounted between said trunions, said camshaft having a first rotational position lifting one end of said horizontal portion of said L-shaped bracket causing said head of said bolt to engage a bottom surface of said drill press base with a force sufficient to frictionally lock said supporting base to said drill press base, said camshaft rotatable to a second position disengaging said head of said bolt from said bottom surface of said drill press base; and means for rotating said camshaft between said first and second rotational positions.

63. The tilt table of claim 61 wherein said transverse slot provided in said drill press base has an opening at one edge of said drill press base and wherein said threaded shank and said nut are receivable into said transverse slot through said funnel-shaped opening.

64. The tilt table of claim 61 wherein said transverse slot provided in said drill press base has a funnel-shaped opening at one end of said drill press base and wherein said threaded shaft and said head of said bolt are receivable in said transverse slot through said funnel-shaped opening.

65. The tilt table of claim 60 wherein said means for pivotably connecting said sector disks to said trunions comprise a first pivot pin pivotably connecting one of said sector disks to a respective one of said trunions and a second pivot pin pivotably connecting the other of said sector disks to the other of said trunions, said first and second pivot pins permitting said pivoting frame to pivot about an axis parallel to said top surface of said drill press base.

66. The tilt table of claim 60 wherein at least one of said sector disks has an angle scale inscribed thereon and wherein said adjacent trunion has an indicator block mounted thereon adjacent to said angle scale, said indicator block having a reference line identifying on said angle scale, the angular orientation of said pivoting frame relative to said base portion of said supporting base.

67. The tilt table of claim 60 further comprising means for frictionally locking said sector disks to said trunions to inhibit the inadvertent pivoting of the pivoting frame relative to said supporting base.

68. The tilt table of claim 60 further comprising a detent mechanism having a spring-loaded member mounted to one of said sector disks and wherein at least three apertures are provided in said adjacent trunion, said spring-loaded member receivable in said at least three apertures to precisely orient the angular relationship between said pivoting frame and said supporting base at three different angles.

69. The tilt table of claim 60 wherein at least one of said sector disks has at least three notches spatially separated from each other at least one selected angle and wherein a trunion associated with said at least one sector disks has an engagement member selectively engageable with said at least three notches, one at a time, said three notches selected to precisely orient the angular relationship between said pivoting frame and said supporting base at three different angles.

70. A work clamp for a drill press having a head assembly mounted on a column attached to a base, said work clamp comprising:

a work clamp housing attachable to said head assembly, said work clamp housing having a substantially vertical guide bore passing therethrough;

a work clamp bar slidably and rotatably received in said guide bore;

means for locking said work clamp bar in said guide bore;

an arm having one end attached to a distal end of said work clamp bar and rotatable therewith about a vertical axis; and a pressure foot attached to a distal end of said arm; and means for displacing said pressure foot relative to said arm.

71. The work clamp of claim 70 wherein said head assembly has a frame, said work clamping housing is attached to said frame.

72. The work clamp of claim 71 wherein said means for locking are locking leaf springs.

73. A drill press assembly comprising:

a substantially horizontal drill press base having an elevated central portion, said elevated central portion having a top surface, a bottom surface and a transverse mounting slot;

a vertical column rigidly attached to said drill press base, said vertical column having a vertical axis of symmetry;

a head assembly slidably attached to said vertical column;

rack and pinion means for displacing said head assembly along said column;

a tilt table assembly attachable to said drill press base, said tilt table assembly having a pivoting base and a pivoting frame pivotably attached to said pivoting base, said pivoting base having a base portion engageable with said top surface of said drill press base and a pair of trunions extending vertically from opposite ends of said base portion, said base portion having at least one longitudinal slot, said tilt table assembly further including a cam activated locking mechanism receivable in said transverse slot through said longitudinal slot, said cam actuated mechanism having an unlocked state permitting said tilt table to be longitudinally, transversely, and rotatably displaced relative to said drill press base and a locked state frictionally locking said bottom portion of said pivoting base to said top surface of said drill press base, and a board insert receivable in said pivoting frame to form a workpiece mounting surface.

* * * * *